(12) United States Patent
Appleyard et al.

(10) Patent No.: US 7,745,788 B2
(45) Date of Patent: Jun. 29, 2010

(54) OPTICAL TRAPPING WITH A SEMICONDUCTOR

(75) Inventors: David C. Appleyard, Sauk City, WI (US); Matthew J. Lang, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 194 days.

(21) Appl. No.: 11/525,518

(22) Filed: Sep. 22, 2006

(65) Prior Publication Data

US 2007/0069119 A1    Mar. 29, 2007

Related U.S. Application Data

(60) Provisional application No. 60/720,113, filed on Sep. 23, 2005.

(51) Int. Cl.
*H05H 3/02* (2006.01)
*G02B 27/00* (2006.01)
*G01J 3/28* (2006.01)

(52) U.S. Cl. .............. 250/338.1; 250/495.1; 250/358.1; 250/362; 250/363.01; 250/492.1; 250/504 R; 359/299; 359/350; 359/355; 359/356; 356/36; 356/51; 356/624; 204/478

(58) Field of Classification Search ................ 250/251, 250/504 R, 336.1, 338.1, 340, 341.1, 341.2, 250/358.1, 362, 363.01, 365, 368, 492.1, 250/495.1; 359/299, 350, 355, 356, 896, 359/641; 356/36, 51, 311, 317, 336, 614, 356/622, 624; 438/7, 12, 115; 435/4, 6, 435/29, 173, 287.1, 287.2; 204/478
See application file for complete search history.

(56) References Cited

U.S. PATENT DOCUMENTS

| | | | | |
|---|---|---|---|---|
| 3,743,825 A | * | 7/1973 | Cohen | 362/227 |
| 3,808,550 A | * | 4/1974 | Ashkin | 372/97 |
| 3,911,275 A | * | 10/1975 | Dumbaugh, Jr. | 250/338.1 |
| 4,568,835 A | | 2/1986 | Imamura et al. | 250/572 |
| 4,599,537 A | * | 7/1986 | Yamashita | 313/501 |
| 5,004,340 A | | 4/1991 | Tullis et al. | 356/243 |
| 5,100,627 A | * | 3/1992 | Buican et al. | 422/108 |
| 5,107,533 A | | 4/1992 | Jaskie | 385/18 |
| 5,144,524 A | | 9/1992 | Tullis et al. | 362/293 |
| 5,317,452 A | | 5/1994 | Prentiss et al. | 359/819 |
| 5,338,930 A | | 8/1994 | Chu et al. | 250/251 |
| 5,445,011 A | | 8/1995 | Ghislain et al. | 73/105 |
| 5,483,095 A | * | 1/1996 | Kagawa et al. | 257/431 |
| 5,528,028 A | | 6/1996 | Chu et al. | 250/251 |
| 5,674,743 A | | 10/1997 | Ulmer | 435/287.2 |
| 5,902,489 A | | 5/1999 | Yasuda et al. | 210/748 |
| 5,952,651 A | * | 9/1999 | Morito et al. | 250/251 |
| 6,067,859 A | | 5/2000 | Käs et al. | 73/800 |
| 6,089,934 A | * | 7/2000 | Biggs et al. | 440/88 R |

(Continued)

FOREIGN PATENT DOCUMENTS

EP        0 846 124       6/1998

(Continued)

OTHER PUBLICATIONS

Neuman et al., "Optical Trapping", Review of Scientific Instruments, *American Institute of Physics*, 75 (9) Sep. 2004, pp. 2787-2809.

(Continued)

*Primary Examiner*—Bernard E Souw
(74) *Attorney, Agent, or Firm*—Weingarten, Schurgin, Gagnebin & Lebovici LLP

(57) ABSTRACT

A method and apparatus are disclosed for forming an optical trap with light directed through or above a semiconductor material. A preferred embodiment selected light-trapping wavelengths that have lower absorption by the semiconductor. A preferred embodiment provides for an optical trapping through semiconductor employing a thin silicon (Si) wafer as a substrate. Further embodiments of the invention provide for microchannel fabrication, force probe measurement, sorting, switching and other active manipulation and assembly using an optical trap.

51 Claims, 24 Drawing Sheets

U.S. PATENT DOCUMENTS

| | | | |
|---|---|---|---|
| 6,139,831 A | 10/2000 | Shivashankar et al. | 424/82.05 |
| 6,143,247 A | 11/2000 | Sheppard, Jr. et al. | 422/63 |
| 6,159,749 A * | 12/2000 | Liu | 436/527 |
| 6,192,866 B1 | 2/2001 | Araki et al. | 123/479 |
| 6,287,765 B1 | 9/2001 | Cubicciotti | 435/6 |
| 6,294,063 B1 | 9/2001 | Becker et al. | 204/450 |
| 6,296,810 B1 | 10/2001 | Ulmer | 422/82.07 |
| 6,319,468 B1 | 11/2001 | Sheppard, Jr. et al. | 422/63 |
| 6,329,105 B1 | 12/2001 | Fujita et al. | 430/2 |
| 6,389,313 B1 | 5/2002 | Marchitto et al. | 604/21 |
| 6,396,053 B1 | 5/2002 | Yokoi | 250/234 |
| 6,420,112 B2 | 7/2002 | Balhorn et al. | 435/6 |
| 6,424,863 B1 | 7/2002 | Flock et al. | 604/20 |
| 6,454,945 B1 | 9/2002 | Weigl et al. | 210/634 |
| 6,532,387 B1 | 3/2003 | Marchitto et al. | 604/21 |
| 6,540,895 B1 | 4/2003 | Spence et al. | 204/450 |
| 6,573,491 B1 * | 6/2003 | Marchitto et al. | 250/251 |
| 6,656,430 B2 | 12/2003 | Sheppard, Jr. et al. | 422/63 |
| 6,680,473 B2 | 1/2004 | Ohmukai et al. | 250/251 |
| 6,686,290 B2 | 2/2004 | Ohmukai | 438/708 |
| 6,689,380 B1 | 2/2004 | Marchitto et al. | 424/449 |
| 6,693,711 B1 | 2/2004 | Leger et al. | 356/369 |
| 6,696,022 B1 | 2/2004 | Chan et al. | 422/99 |
| 6,734,436 B2 * | 5/2004 | Faris et al. | 250/432 R |
| 6,744,038 B2 * | 6/2004 | Wang et al. | 250/251 |
| 6,762,025 B2 | 7/2004 | Cubicciotti | 435/6 |
| 6,767,706 B2 | 7/2004 | Quake et al. | 435/6 |
| 6,767,731 B2 | 7/2004 | Hannah | 435/287.2 |
| 6,778,724 B2 | 8/2004 | Wang et al. | 385/16 |
| 6,784,420 B2 * | 8/2004 | Wang et al. | 250/251 |
| 6,798,511 B1 | 9/2004 | Zhan et al. | 356/369 |
| 6,802,489 B2 | 10/2004 | Marr et al. | 251/129.14 |
| 6,806,477 B1 | 10/2004 | Saito et al. | 250/491.1 |
| 6,815,664 B2 | 11/2004 | Wang et al. | 250/251 |
| 6,821,730 B2 | 11/2004 | Hannah | 435/6 |
| 6,824,664 B1 | 11/2004 | Austin et al. | 204/643 |
| 6,828,786 B2 | 12/2004 | Scherer et al. | 324/300 |
| 6,833,242 B2 | 12/2004 | Quake et al. | 435/6 |
| 6,833,542 B2 | 12/2004 | Wang et al. | 250/251 |
| 6,833,923 B2 | 12/2004 | Florin et al. | 356/601 |
| 6,852,492 B2 | 2/2005 | Berlin et al. | 435/6 |
| 6,943,062 B2 * | 9/2005 | Chen et al. | 438/115 |
| 6,991,906 B1 * | 1/2006 | Fuhr et al. | 435/7.1 |
| 7,079,241 B2 * | 7/2006 | Empedocles et al. | 356/326 |
| 7,109,473 B2 * | 9/2006 | Grier et al. | 250/251 |
| 7,255,192 B2 * | 8/2007 | Perrin et al. | 180/305 |
| 7,435,362 B2 * | 10/2008 | Muraoka et al. | 252/582 |
| 2002/0006648 A1 * | 1/2002 | Goodman et al. | 435/173.1 |
| 2002/0063868 A1 * | 5/2002 | Florin et al. | 356/625 |
| 2002/0117623 A1 * | 8/2002 | Cole | 250/338.1 |
| 2002/0181113 A1 * | 12/2002 | Grier et al. | 359/614 |
| 2004/0021949 A1 * | 2/2004 | Grier et al. | 359/614 |
| 2004/0036976 A1 * | 2/2004 | Grier et al. | 359/614 |
| 2004/0110208 A1 | 6/2004 | Chan et al. | 435/6 |
| 2004/0126790 A1 | 7/2004 | Su et al. | 435/6 |
| 2004/0191778 A1 * | 9/2004 | Inaoka | 435/6 |
| 2004/0206896 A1 | 10/2004 | Ohmukai et al. | 250/251 |
| 2004/0248186 A1 | 12/2004 | Berlin et al. | 435/6 |
| 2005/0158889 A1 * | 7/2005 | Brouillette et al. | 438/16 |
| 2005/0227071 A1 * | 10/2005 | Muraoka et al. | 428/403 |
| 2006/0097682 A1 * | 5/2006 | Perrin et al. | 318/568.12 |
| 2007/0069119 A1 * | 3/2007 | Appleyard et al. | 250/251 |
| 2008/0121790 A1 * | 5/2008 | Grier | 250/251 |
| 2008/0274905 A1 * | 11/2008 | Greene | 506/4 |
| 2010/0012827 A1 * | 1/2010 | Vestergaard Hau | 250/251 |

FOREIGN PATENT DOCUMENTS

WO     WO 02/056431     7/2002

OTHER PUBLICATIONS

Visscher et al., "Construction of Multiple-Beam Optical Traps with Nanometer-Resolution Position Sensing", *IEEE Journal of Selected Topics in Quantum Electronics*, 2 (4) Dec. 1996, pp. 1066-1076.

Ishijima et al., "Simultaneous Observation of Individual ATPase and Mechanical Events by a Single Myosin Molecule during Interaction with Actin", *Cell* 92 Jan. 23, 1998, pp. 161-171.

Terray et al., "Fabrication of linear colloidal structures for microfluidic applications", *Applied Physics Letters*, 81 (9) Aug. 26, 2002, pp. 1555-1557.

Haruff et al., "Directed bacterial surface attachment via optical trapping", *Colloids and Surfaces B: Biointerfaces* 27 (2002), pp. 189-195.

Yin et al., "Submicron patterning of DNA oligonucleotides on silicon", *Nucleic Acids Research*, 32 (14) 2004, 7 pages.

Goede et al., "Binding Specificity of a Peptide on Semiconductor Surfaces", *Nano Letters*, 4 (11) 2004, pp. 2115-2120.

Ni et al., "Molecular Orientation of a ZnS-Nanocrystal-Modified M13 Virus on a Silicon Substrate", *Journal of Polymer Science: Part B: Polymer Physics*, 42 2004, pp. 629-635.

Higurashi et al., "Optical trapping of low-refractive-index microfabricated objects using radiation pressure exerted on their inner walls", *Optics Letters*, 20 (19) Oct. 1, 1995, pp. 1931-1933.

Holmlin et al., "Light-Driven Microfabrication: Assembly of Multicomponent, Three-Dimensional Structures by Using Optical Tweezers", *Agnew. Chem. Int. Ed.*, 39 (19) 2000, pp. 3503-3506.

Tanese et al., "Magnetic trapping and self-assembly of multicomponent nanowires", *Journal of Applied Physics*, 91 (10) May 15, 2002, pp. 8549-8551.

Tang et al., "Nanofabrication with Atomic Force Microscopy", *Journal of Science and Nanotechnology*, 4 (8) 2004, pp. 948-963.

Molhave et al., "Towards Pick-and-Place Assembly of Nanostructures", *Journal of Nanoscience and Nanotechnology*, 4 (3) 2004, pp. 279-282.

Mao et al., "Virus-Based Toolkit for the Directed Synthesis of Magnetic and Semiconducting Nanowires", *Science*, 303 Jan. 9, 2004, pp. 213-217.

Seeman et al., "Emulating biology: Building nanostructures from the bottom up", *PNAS*, 99 (2) Apr. 30, 2002, pp. 6451-6455.

Maruccio et al., "Projecting the nanoworld: Concepts, results and perspectives of molecular electronics", *Journal of Materials Chemistry*, 14 2004, pp. 542-554.

Physics News 352, Dec. 22, 1997 (Applied Physics Letters, Dec. 22, 1997), Google search result (Abstract, 3 pages).

Optical Tweezers An Introduction, 5 pages.

"Optical Tweezers and Immunoassay", *Clinical Chemistry*, 43 (2) 1997, pp. 251-253.

Peterman et al., "Extending the bandwidth of optical-tweezers interferometry", *Review of Scientific Instruments*, 74 (7) Jul. 2003, pp. 3246-3249.

Vossen et al., "Building Two and Three-dimensional Structures of Colloidal Particles on Surfaces using Optical Tweezers and Critical Point Drying", *Materials Research Society*, 705 2002, pp. 205-210.

Lie et al., "Immobilisation and synthesis of DNA on Si(111), nanocrystalline porous silicon and silicon nanoparticles", *The Royal Society of Chemistry*, 2003 pp. 235-249.

Enger et al., "Optical tweezers applied to a microfluidic system", *Lab Chip*, 2004, 4, pp. 196-200.

Grier, David, "A revolution in optical manipulation," Nature, Aug. 14, 2003, 810-816, vol. 424, 2003 Nature Publishing Group.

Ulanowski, Z. et al., "Compact optical trapping microscope using a diode laser," Meas. Sci. Technol. 11 (2000), 1778-1785, IOP Publishing Ltd, UK.

Sinclair, G. et al. "Assembly of 3-dimensional structures using programmable holographic optical tweezers," Optics Express, vol. 12, No. 22, Nov. 1, 2004, 5475-5480, Optical Society of America.

Sasaki, K. et al., "Pattern formation and flow control of fine particles by laser-scanning micromanipulation," Optics Letters, 16, No. 19, Oct. 1, 1991, Optical Society of America, NY.

\* cited by examiner

Optically conjugate planes are represented with cross-hatch.

FIG. 5C

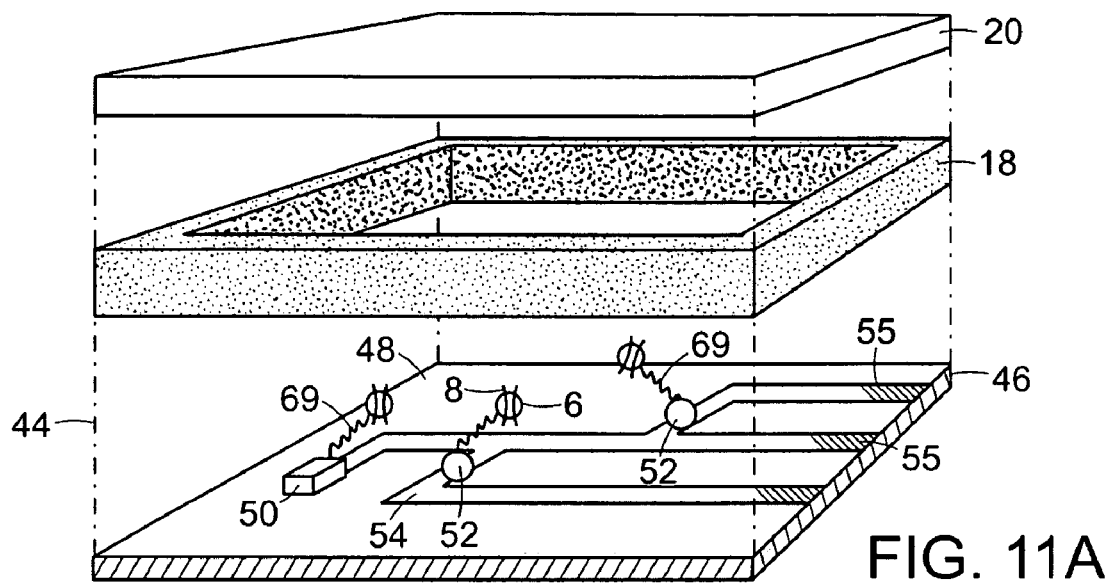
FIG. 11A
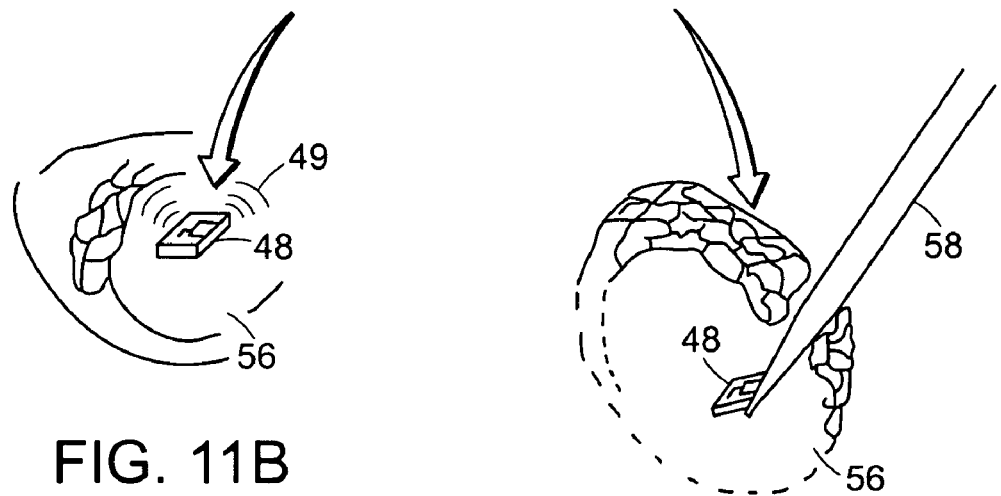
FIG. 11B
FIG. 11C

OPTICAL TRAPPING WITH A SEMICONDUCTOR

CROSS REFERENCE TO RELATED APPLICATIONS

This application claims the benefit of U.S. provisional patent application No. 60/720,113 filed on Sep. 23, 2005, which is incorporated herein in its entirety by reference.

BACKGROUND OF THE INVENTION

Optical traps are instruments that use a focused light beam to hold micron-scale objects with photon forces in a localized region in space. Optical trapping has become an important research technology in biology and physics, and more recently in commercial applications, useful for designing, manipulating, sorting and assembling objects at the nanomolecular scale. In addition, optical trapping can be used to evaluate picoNewton-scale force interactions between molecules (force-probe research) and to control nanostructures and nanoswitches.

A conventional optical trap is initiated by focusing a laser beam through an objective lens of high numerical aperture. The focused light produces a 3-dimensional, radial, intensity gradient, which increases as light converges upon the focus (focal point) and then diminishes as the light diverges from the focus. A dielectric object located closely down-beam of the focus will experience a combination of forces caused by transfer of momentum from photons, resulting from both scattering and refraction.

Dielectric objects used alone or as "handles" to manipulate other microscopic objects are typically in the range of about 0.2 to 5 microns, which is the same size range as many biological specimens that can be trapped directly, e.g., bacteria, yeast and organelles of larger cells.

It is known to construct optical traps using optical gradient forces from a single beam of light to manipulate the position of a small dielectric object immersed in a fluid medium whose refractive index is smaller than that of the particle. The optical trapping technique has been generalized to enable manipulation of reflecting, absorbing and low dielectric constant particles as well.

Typically, optical traps have been developed using standard microscopy substrates, primarily the traditional, standard, glass microscope slide. A microscopic object to be trapped will usually be immersed in an oil or aqueous fluid medium maintained between two glass slides separated by a spacer. In addition to stabilizing and limiting the movement of the object somewhat, the immersion fluid provides an index of refraction that can be selected to be less than the index of refraction for the object itself, with the ratio of these refractive indices being important to generating the optical trapping forces.

Traditionally, glass substrate slides have been used because they are commonly available for adaptation to microscopic sample stages and because they are substantially transparent to wavelengths of visible light (350 to 700 nanometers) commonly used with microscopy.

SUMMARY OF THE INVENTION

The present invention relates to the use of semiconductor materials that are used with an active volume to provide an optical trap with light directed through a semiconductor material, or closely adjacent to or above a semiconductor material. Light from a light source, such as an infrared (IR) or near-infrared (NIR) light source is directed through, or closely adjacent to, the semiconductor material and into the active volume.

A preferred embodiment of the invention provides for a semiconductor material interposed between a focusing objective lens and a sample volume for an optical trap.

A preferred embodiment of the invention provides a near infrared (NIR) laser at a wavelength that transmits sufficient power to the trap, preferably a wavelength that is poorly absorbed by the semiconductor material, to provide for the use of optical trapping techniques. The semiconductor provides a window to the trapping chamber or volume. A semiconductor wafer positioned between the objective lens and the sample volume can be thin or have a thinned region to improve transmission of the laser beam through the semiconductor. Preferably, the semiconductor wafer is polished on both sides in order to reduce refraction and scattering by the wafer, as well as to provide a flat surface for contact with the sample, although substrates that have other surface characteristics, such as, for example, etched surfaces, are also within the scope of the invention.

Another preferred embodiment provides for two objective lenses to be used, one on each side of the sample plane. One objective lens sits below the semiconductor substrate that bounds the sample chamber and is used to focus an infrared laser beam at the sample plane for the purpose of forming the optical trap. The second objective lens (the imaging lens), or a darkfield imaging lens, is used in place of a traditional condenser lens to provide a condenser-side imaging system to allow viewing of the sample during trapping. This places the illumination light source and the camera on the same side of the sample (in terms of the optical path), and uses the same lens to focus the illumination source on the sample plane and to collect the reflected light from the sample and focus it into the image for the camera.

In a further preferred embodiment of the invention a tube lens is used to magnify the image created by the imaging objective. Also, there is provided a telescope lens pair to expand the laser beam to the appropriate size for optimal trapping, as well as to allow the trap to be steered in the sample plane. Alternatively, or by further combination, integration of acoustic-optic deflectors and/or galvanometer mirrors can accomplish similar steering.

One of the preferred embodiments provides for manipulating a micro-scale or nano-scale wire (or thin structure) into a specific proximity or contact with a semiconductor surface at a precise location by trapping the wire using an optical trap using light transmitted through the same semiconductor substrate. Another method is disclosed for manipulating a micro-scale or nano-scale bridge (or a prefabricated 3-D structure) into specific proximity to or contact with a semiconductor surface feature at a precise location by trapping the bridge structure using an optical trap activated through the same semiconductor substrate. As well, there is provided a method for manipulating a micro-scale or nano-scale dielectric object into specific proximity or contact with a semiconductor surface at a precise location by trapping the object using an optical trap beamed through or closely proximate to the same semiconductor substrate, then repeating this action with another object and then placing another semiconductor layer in a stacking fashion upon the object.

A further embodiment of the invention provides a method for manipulating one or more micro-scale or nano-scale objects, either directly or using bead handles, and optionally fixing the objects to a micro-scale structure, optionally using multiple trapping beams, in order to further manipulate the one or more objects and/or structure in specific proximity or contact with a semiconductor surface at a precise location by holding the objects and/or structure through light-trapping forces applied to the objects or bead handles, and applying the optical trap beam through the same semiconductor substrate.

Yet another preferred embodiment provides a method for manipulating a micro-scale or nano-scale object into a specific proximity or contact with a semiconductor surface at a precise location and orientation to operate as a switch for a flow fluid (e.g., photonic or electric), by optically trapping or otherwise manipulating, such as, e.g., by pushing or pulling the object using a light beamed through the semiconductor substrate.

A preferred method for manipulating a micro-scale or nano-scale object in proximity to or contact with a semiconductor surface to operate as a sorting method for biological or non-biological objects, by trapping the object(s) using an optical trap beamed through, or closely proximate to or above, the semiconductor substrate.

According to a further preferred embodiment of the invention there is provided a method for manipulating a micro-scale or nano-scale object in proximity to or contact with a semiconductor surface to operate as a force probe to examine interactions between objects, molecules and/or the semiconductor surface, by trapping the probe or a bead handle attached to the probe using an optical trap beamed through the semiconductor substrate and/or using an optical trap formed above or proximate a semiconductor substrate.

The invention provides yet another preferred embodiment that includes a method for manipulating a micro-scale or nano-scale object in proximity to or contact with a semiconductor surface to assemble biological and/or non-biological molecular objects into association with or contact with a semiconductor substrate by trapping the object using one or more optical traps beamed through and/or formed proximate to the semiconductor substrate, where the combined structure creates a microscopic, medical detection or diagnostic device or bioreactor.

Embodiments of the present invention provide for improvements in optical trapping by introducing a sufficiently transmissive semiconductor substrate that can provide an electrically conductive surface proximate to the trapped microscopic object. More specifically circuits and devices can be fabricated in the semiconductor including optical or pressure sensors or light emitting devices such as LEDs or lasers, as well as control circuits for such devices. The method provides for viewing a microscopic object trapped by a laser beam projected through a semiconductor substrate, where the substrate is opaque to visible or infrared light. A particular advantage is provision of a method and device for trapping or holding a microscopic dielectric object or set of objects in close proximity to a semiconductor substrate and manipulating the object or objects in specific relation to features of the substrate, to effect nanometer scale assembly of and assembly on semiconductor devices (wherein the objects assembled can include non-semiconductor components, such as, e.g., spacers, waveguides and beads, inter alia), to cause nano-scale process interactions relating to electrical conductance, and/or to measure forces of interaction between microscale objects and proximate semiconductor surfaces and surface features.

The disclosed methods and devices provide for examination of various molecular interactions between biological molecules and silicon substrates (such as measuring binding force interactions between DNA or proteins and a silicon substrate), relevant to the design of biological detectors, bioreactors, nano-devices and relevant to other silicon-biology fields. Further, a disclosed method for bonding components to a substrate whereby direct adhesion or a photo-initiated polymerization uses a focused UV or visible laser, that is combined with the positioning ability of an optical trap to improve the active, directed, construction of microstructures in or closely adjacent to silicon and other semiconductor systems.

Other objects, features and advantages of the present invention will be readily apparent from the following description of the preferred embodiments thereof, taken in conjunction with the accompanying drawings described below wherein like elements have like numerals throughout.

BRIEF DESCRIPTION OF THE DRAWINGS

FIG. 5C illustrates using optically trapped beads according to the invention to suspend an M13 virus particle coated with CdS between two electrical terminals on a silicon substrate.

FIG. 11A illustrates an example of a preferred embodiment providing a method of using an optical trap through semiconductor to position a biomolecular structure in proximity to or contact with a semiconductor surface and/or surface feature in order to create a biomedical detector.

FIG. 11B illustrates an example of a preferred embodiment of the invention providing for a free-floating micro-scale biomedical detector in the form of a semiconductor device with attached biomolecular structure that was microfabricated by use of an optical trap through semiconductor according to preferred methods of the invention.

FIG. 11C illustrates an example of a preferred embodiment providing a probe-mounted biomedical detector in the form of a semiconductor device with attached biomolecular structure that was microfabricated by use of an optical trap through semiconductor according to the invention.

DETAILED DESCRIPTION

Figure 1A:
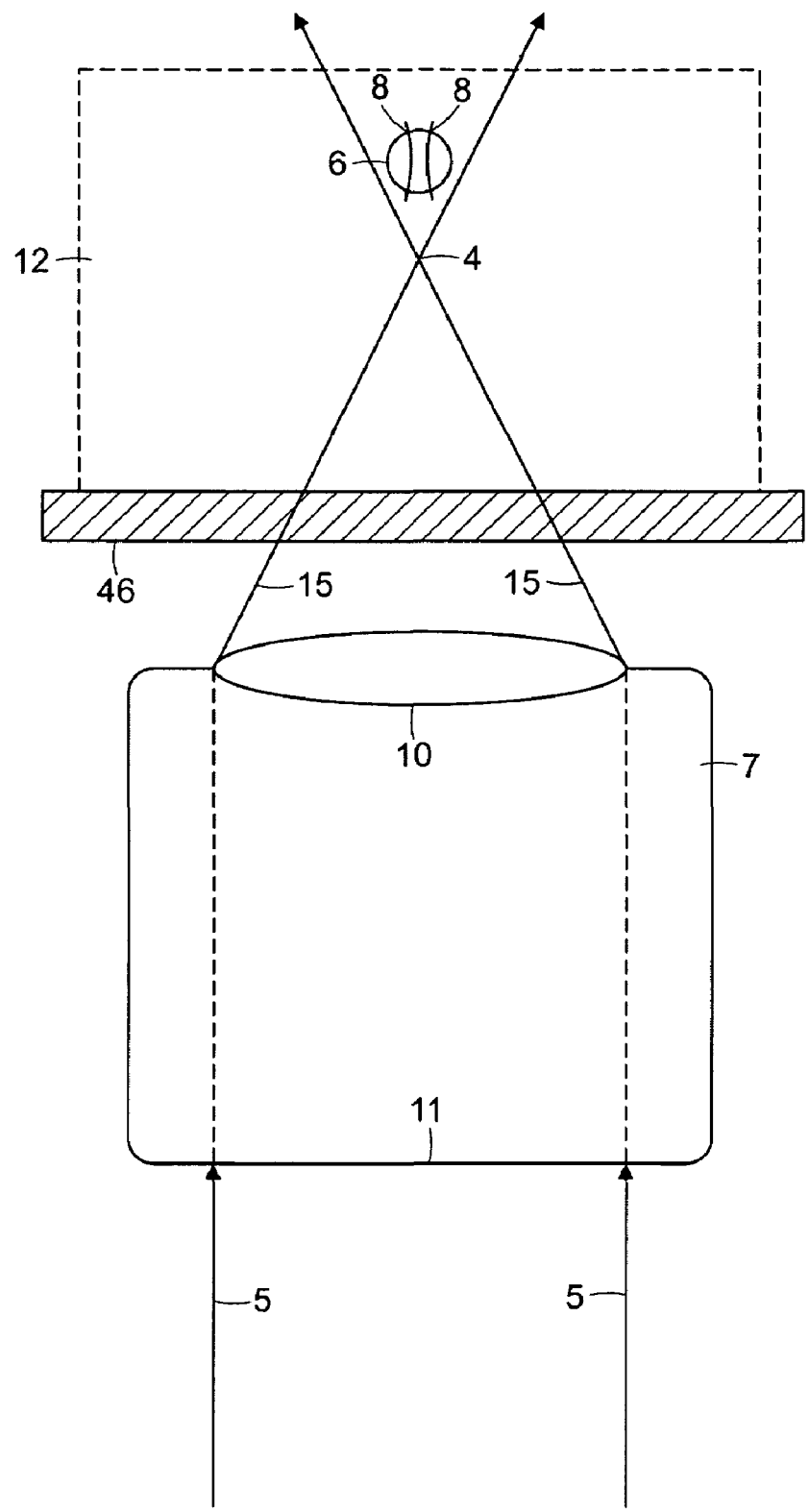
FIG. 1A is a magnified schematic of the trapping region of an optical trap, according to a preferred embodiment of the invention, formed through a semiconductor, where a microscopic object within the trapping region is held downbeam of a focal point by a light beam projecting through an objective lens and through the semiconductor layer.
Figure 1B:
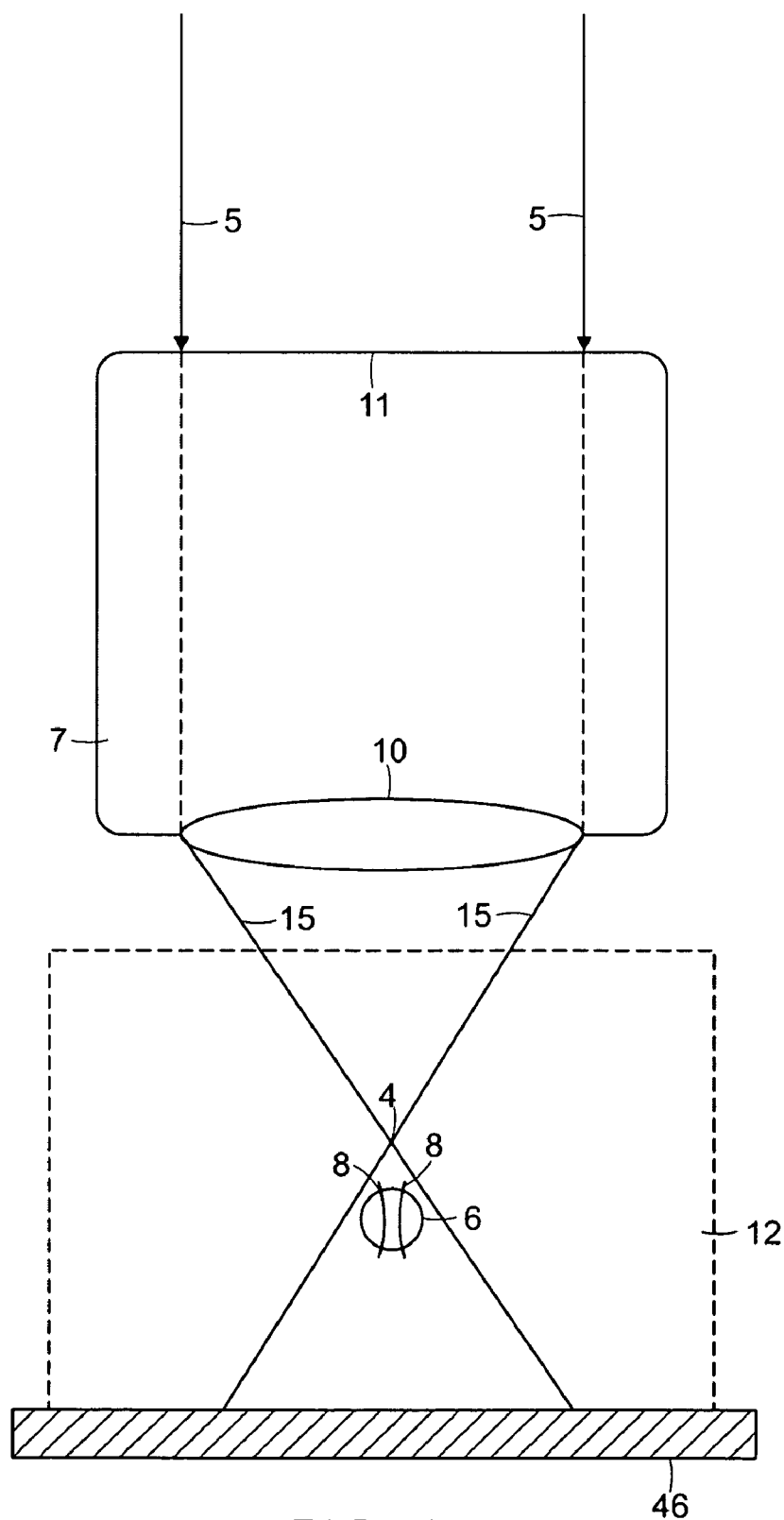
FIG. 1B is a magnified schematic of the trapping region of an optical trap according to another embodiment of the invention, formed closely adjacent to and/or above a semiconductor, where a microscopic object within the trapping region is held downbeam of a focal point by a light beam projecting through an objective lens and closely adjacent to and/or above the semiconductor layer.

To assist understanding the improvement of the invention, FIGS. 1A-B, illustrate several features of an optical trap system in accordance with the invention.

Referring to FIG. 1A, in an optical trap through semiconductor, light rays 5 (such as from a laser beam or other high intensity light source capable of applying the forces needed to trap and manipulate an object) are projected into the center of a back aperture 11 of a converging optical element (such as an objective 7 containing objective lens 10). These light rays 5 passing through objective lens 10 emerge as focused light rays 15, which converge upon a focus 4, in order to controllably manipulate a small dielectric object 6. In one embodiment of the invention, a semiconductor material 46 is positioned between lens 10 and the optical trap, wherein crossed optical paths forming a focus at point 4 form the outside of the optical trap. Region 12 defines the range of movement of focus 4, which depends on the working distance of the objective and the steering optics employed in each particular embodiment. In another preferred embodiment, as shown in FIG. 1B, the semiconductor material can be so arranged that the optical trap is between lens 10 and closely proximate to semiconductor 46. In FIGS. 1A and 1B, to indicate schematically that an object, such as object 6, is being held in an optical trap, there are drawn through the object two curved lines 8,8. This convention is followed in all of the drawings that follow herein. It will be appreciated, then, that the reference to trap-indicator 8 is not intended to illustrate the physics or the exact physical location of the optical trap itself.

Examples of elemental semiconductor materials 46 include, inter alia, silicon (Si) and germanium (Ge), which can be doped to provide conductivity levels suitable for the formation of opto-electronic devices and circuits. Compound semiconductors include, inter alia, InSb, InAs, GaP, GaSb, GaAs, SiC, GaN, and CdS. A further embodiment includes using gold (Au), a non-semiconductor in gold-coated coverslips.

Single crystal silicon is used in a preferred embodiment of the invention. Amorphous silicon (a-Si) is a non-crystalline form that does not form a continuous crystalline lattice, with dangling bonds occurring as defects in the continuous random network. Nanocrystalline silicon (nc-Si) has small grains of crystalline silicon within the amorphous phase, in contrast to polycrystalline silicon (poly-Si) which comprises crystalline silicon grains, separated by grain boundaries. The difference can come from the grain size of the crystalline grains. nc-Si has many useful advantages over a-Si, one being that if grown properly it can have a higher mobility, due to the presence of the silicon crystallites.

These semiconductors and combinations thereof are contemplated for use with the disclosed methods of the invention. While the preferred embodiment describes methods employing silicon (Si) as the semiconductor, other preferred embodiments utilize other semiconductor materials referenced herein.

Referring again to FIG. 1A, as depicted in the magnified detail, the optical trap comprises a region of electromagnetic forces (optical gradient and scattering forces) closely proximate to and concentric about the focal point 4, with the trapped dielectric object 6 being held locally in space by the trap, as indicated schematically by trap indicator 8, nearly proximate to focal point 4. Trapping region 12 is therefore an "active volume" determined by the potential spatial range of focus 4, and hence defines the spatial range of the trap.

In general, any suitable focusing optical system can form the basis for an optical trap system. Those of ordinary skill in the art will appreciate that manipulation of reflecting, absorbing and low dielectric constant objects can be carried out using such systems. Any of these techniques can be implemented in the context of the invention and will be encompassed by use of the terminology "optical trap" hereinafter.

Figure 2A:
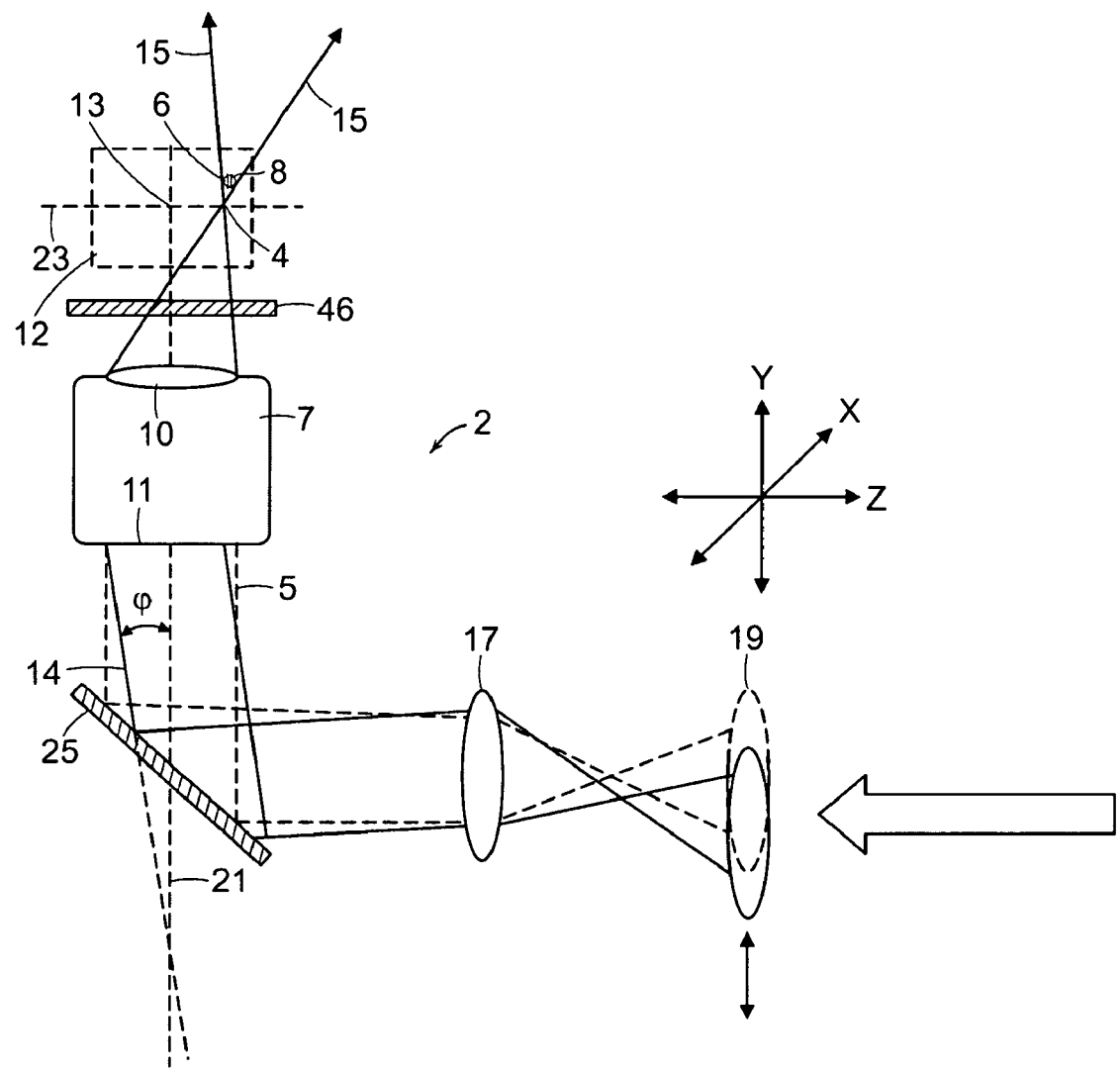
FIG. 2A illustrates how an optical trap according to a preferred embodiment of the invention can be moved by translation of telescope lens to achieve focal point movement in the focal plane.

By way of example, as shown in FIG. 2A, in an optical trap system 2 in accordance with the invention, the light beam 5 has an input angle p relative to an optical axis 21. The focused light beam 15 output from the objective lens 10 substantially converges to a focal point 4 in focal plane 23. In the case of the light beam 5 being a collimated laser beam and having its axis 14 coincident with the optical axis 21, then the light beam 5 would enter the back aperture 11 of the objective 7 parallel with optical axis 21, which is the geometry depicted in FIG. 1A and would be brought to a focus 4 within the imaging volume 12 at the center point 13 of the objective lens focal plane 23. However, as depicted in FIG. 2A, when the axis of the light beam 414 is displaced by the angle φ with respect to the optical axis 21, beam axis 414 and the optical axis 21 coincide only at the center point B of the back aperture 11. This displacement enables translation movement of the optical trap in the focal plane. Depicted in FIG. 2A is a telescope lens pair 17 and 19, and translation of the telescope lens 17, 19 achieves movement of the focal point in the focal plane.

Figure 2B:
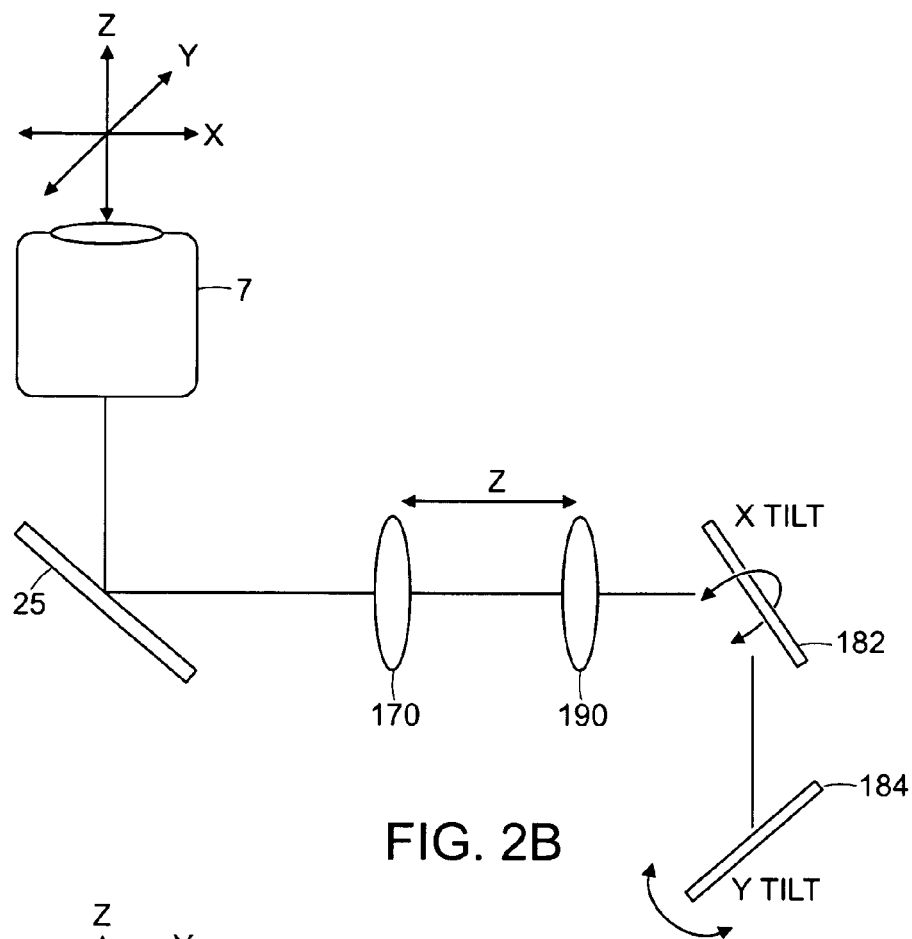
FIG. 2B illustrates how an optical trap according to a preferred embodiment of the invention can be moved by rotating steering mirrors around the x and y axes.
Figure 2C:
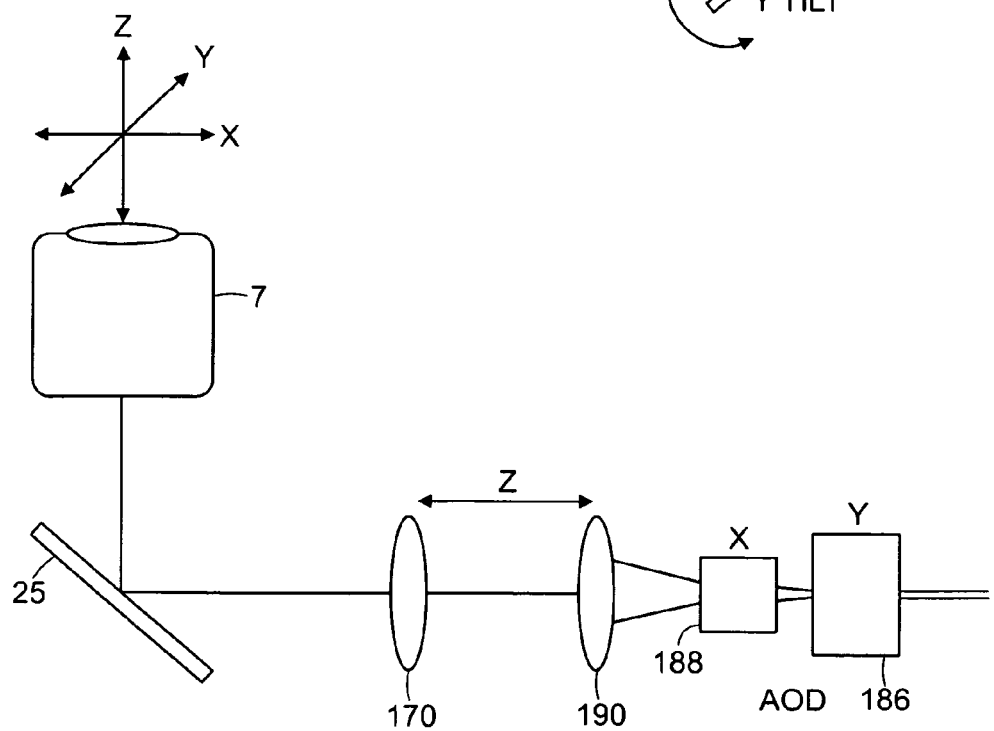
FIG. 2C illustrates how an optical trap according to a preferred embodiment of the invention can be moved by steering with acousto-optic deflectors (AODs) in the x and y planes.

A preferred embodiment also provides for movement of the optical trap with beam steering in three dimensions, which can be accomplished by adjusting separation of lenses 170 and 190 for z-axis control, and tilting mirrors 182, 184 around the x and y axes, respectively, as shown in FIG. 2B or by acousto-optical deflectors (AODs) 186, 188, as shown in FIG. 2C. The AOD for the optical trapping laser can be used to move the trapping focal point by changing an RF frequency that is input from an amplifier to the AOD, which frequency can be, for example, 26 MHz, so that a slightly different frequency, such as, for example, 26.5 MHz will cause a change in the angle of the deflected beam, and thereby cause a translation of the beam in the specimen plane within the trapping region. In one embodiment, only the deflected beams go into the microscope objective. The other beams, including the fundamental beam (the only beam that would be present if the AOD is removed from the laser path) are blocked with a physical barrier (such as an iris). A further preferred embodiment provides for two AOD components placed sequentially in the optical trapping beam to each deflect the beam along separate x and y axes. As well, a holographic element can be used to provide full x, y and z movement.

Figure 2D:
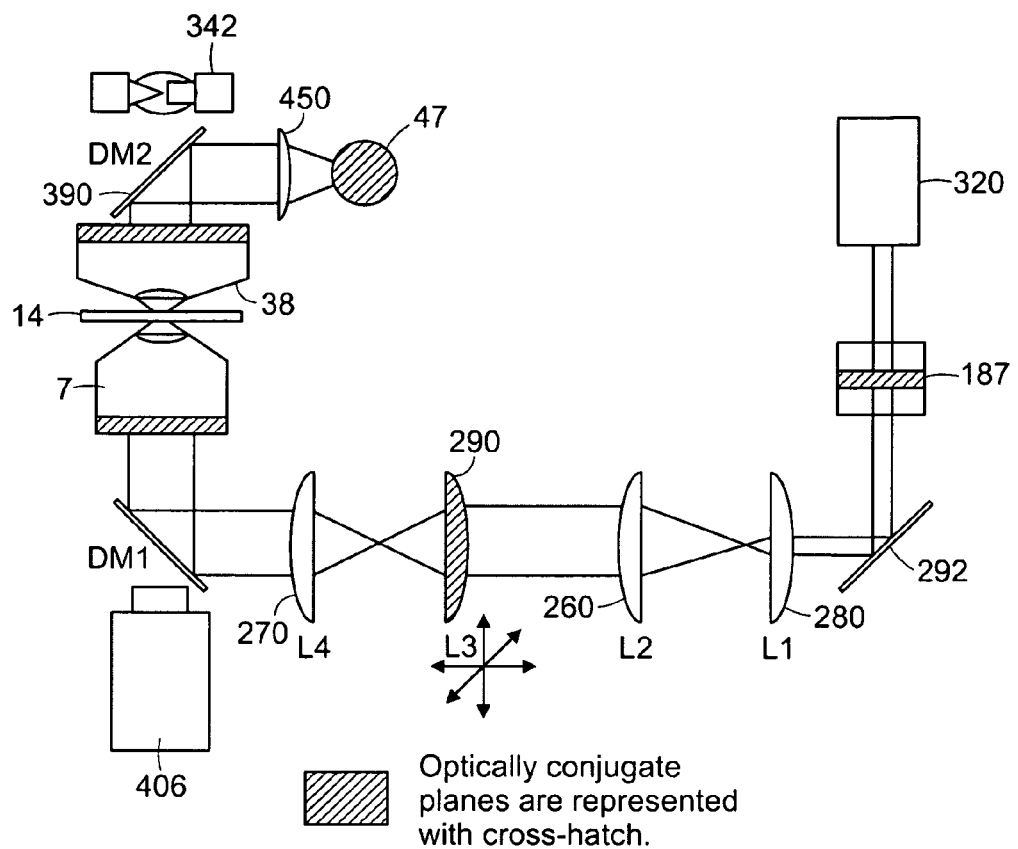
FIG. 2D illustrates a layout of an optical trap according to an embodiment of the invention that offers back focal plane position detection, bright field transmission imaging, and beam steering.

FIG. 2D illustrates how a further embodiment provides a layout of an optical trap with back focal plane position detection, bright field transmission imaging, and beam steering, where generally DM is a dichroic mirror, L is a lens, and CCD is a charge coupled device camera. In this layout, laser 320 passes through beam steering 187, which can be an acousto-optic device (AOD). The optical path reflects from mirror 292 through beam expander lenses 260, 280 and then through steering lenses 290, 270, before being directed by dichroic mirror 370 onto the back plane of microscope objective 7. The trapping laser is focused in sample region 14 and then collected in condenser 38, being then directed onto dichroic mirror 390 which directs the signal through lens 450 to be focused onto position detector 47. Microscope illumination 342 starting on the condenser side passes through dichroic 390, through the condenser 38, sample region 14, objective 7 and dichroic 370 to reach and be imaged by CCD camera 406.

Figure 3A:
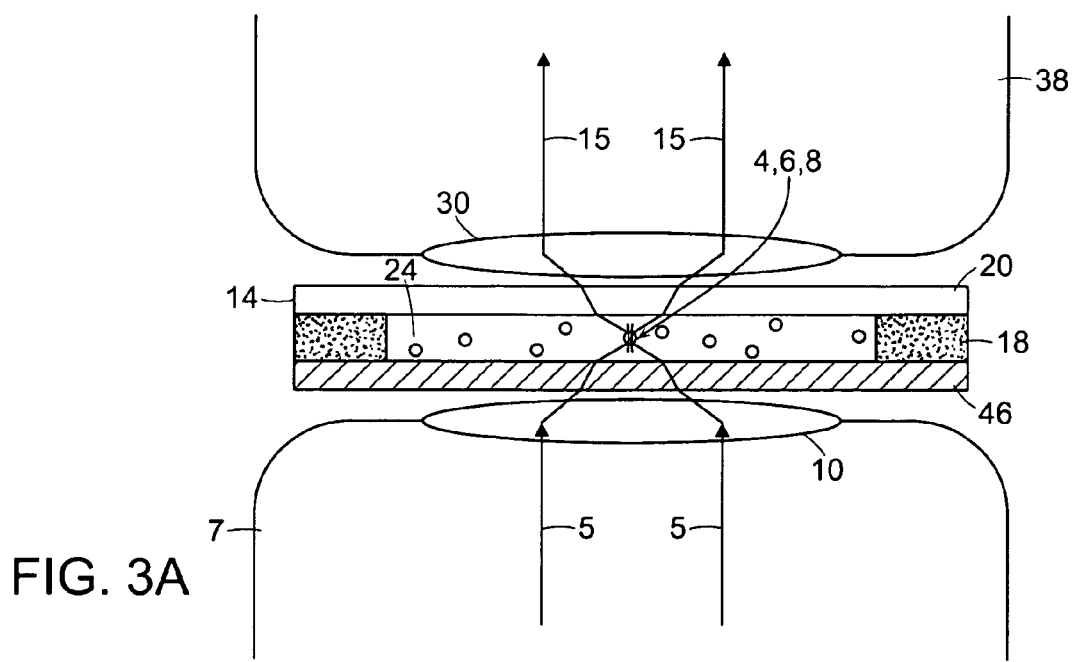
FIG. 3A illustrates a close-up detail, in cross-section, of a sample chamber of a preferred embodiment of the present invention using a semiconductor substrate.

FIG. 3A illustrates a close-up detail of a sample chamber 14, overlapping an active volume as provided by one embodiment of the present invention where microscopic objects are held in a fluid medium between one slide and one semiconductor substrate. Typical chambers in optical traps have previously employed standard 1 inch by 3 inch glass microscope slides on the top, with a common cover slip on the bottom (200 microns thick, about 22×40 mm in area, although other sizes are available). As shown in magnified, cross-sectional detail in FIG. 3A, the sample chamber 14 according to the invention is positioned between the focusing objective lens 10 and the imaging objective lens 30. A microscopic object to be trapped with the laser beam will usually be immersed in an oil or aqueous fluid medium 24 maintained between a first semiconductor material 46 nearest the focusing lens 10 and a covering glass second slide 20 nearest the imaging objective lens 30, the two layers being held apart by a spacer layer 18. The focus 4, optical trap 8 and trapped object 6 are within the immersion fluid medium 24. In addition to stabilizing and damping the movement of the object 6, the fluid medium 24 will have a characteristic index of refraction. Thus, a specific fluid can be selected with a refractive index less than the index of refraction for the object 6 itself, with the ratio of these refractive indices being important for generating the component of the trapping force directed up-beam. Thin oil layers 242 and 244 can be located proximate to the oil immersion objective lens 10 and condenser lens 30.

Referring still to FIG. 3A, according to a preferred embodiment of the invention, the substrate 46 proximate or distal to the focusing lens 10 is, for example, a thin semiconductor layer comprised of silicon (Si). Optical trapping through silicon requires many hurdles to be overcome. For substrate 46 proximate to the lens 10, the trapping laser 15 must be able to penetrate the silicon substrate 46 with enough power transmission to form an optical trap in the sample plane within sample chamber 14. Thus, the wavelength of the laser must be selected such that the absorbance by the silicon substrate is minimized. Additionally, for many applications, particularly involving biological molecules, optimizing the trapping strength without using excessive laser intensity is important, too, in order to avoid excessive sample heating and possible damage to sensitive molecular and/or physical structures.

Evaluating absorption curves for water and Si surfaces is useful for selecting trapping-laser wavelengths that can minimize absorption by both water and Si. Minimization of absorbance for multiple samples can reduce the need for multiple trapping lasers. The water absorption curve is provided as a gauge for sample heating and possible biological damage.

Figure 3B:
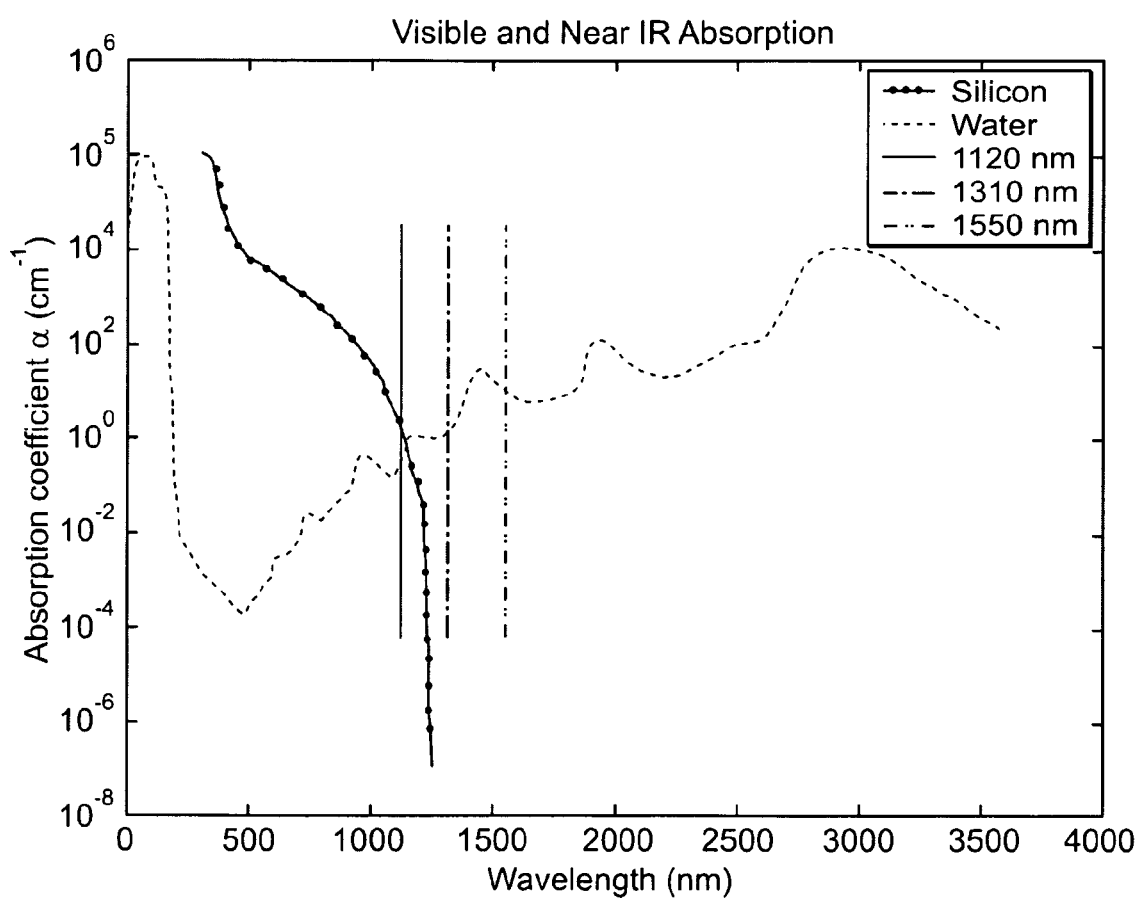
FIG. 3B illustrates absorption curves for water and Si surfaces, together with a selection of possible trapping laser wavelengths which minimize absorption by both water and Si are highlighted.

The absorption curves in FIG. 3B show that the absorbance of silicon begins to diminish at wavelengths of about 1000 nm (near infrared), and thus lasers with wavelengths near 1000 nm and greater are preferred in terms of the absorbance of silicon, with a preferred range being from 900 nm to 1600 nm. Because the absorbance of water in this local wavelength region is an increasing function toward longer wavelengths, a more preferred range of wavelength will be between 900 nm to 1400 nm, and even more preferably between 1000 nm to 1300 nm. A 980 nm, 150 mW laser was used in one preferred embodiment and several other common lasers are practical choices, for example, including Nd:YAG (1064 nm), GaInAsP (1300 nm, up to 1570 nm, preferably), or other lasers. A most preferred embodiment utilizes a 1064 nm Nd:Yag laser as the trapping light source, as it is established that this is a relatively less harmful wavelength for biological manipulation and because this wavelength exhibits ~40% transmission through a 200 μm silicon substrate, increasing the strength (or stiffness) of the trap.

Absorbance by the silicon substrate 46 is also proportional to its thickness, hence, thin silicon wafers <250 micrometers are employed in the preferred embodiment. An additional reason for preferring substrates less than 250 micrometers is that this thickness is the approximate working distance of the microscope objective; thus, to enable the focal point to stay within the bounds of the internal volume of the sample chamber 14, the substrate thickness must be less than this working distance. A most preferred substrate thickness being near or less than 200 micrometers.

The silicon substrate 46 in the preferred embodiment is double-side-polished silicon wafer in order to reduce refraction and scattering by the substrate layer itself, as well as to provide a flat substrate surface and to further reduce the substrate thickness. It will be appreciated, however, that in other embodiments discussed below, where particular actions and/or processes pertain to the surface of the semiconductor substrate 46 either facing the active volume or interior to the chamber 14, this interior substrate surface may have specific irregularities or features disposed upon it, in which case this interior surface may not be perfectly flat or polished.

The flexible configuration of the optical trap according to many embodiments of the invention enables trapping above these substrates (such substrates as, for example, Si, CdS, GaN and $Al_2O_3$) in the event that a sub-200 μm thickness is unavailable, by flipping the slide or wafer and forming the trap through a glass coverslip (i.e., placing the sample substrate on the "top"). For other samples, it can be advantageous to deposit a thin layer of the substrate material of interest, such as, for example, a semiconductor material or a metal, upon a conventional glass coverslip. This is particularly valuable for materials with a large absorbance. For example, gold has very high absorbance, making it inconvenient to trap through a large thickness, yet it acts as a functional substrate when deposited in an extremely thin layer.

Figure 4A:
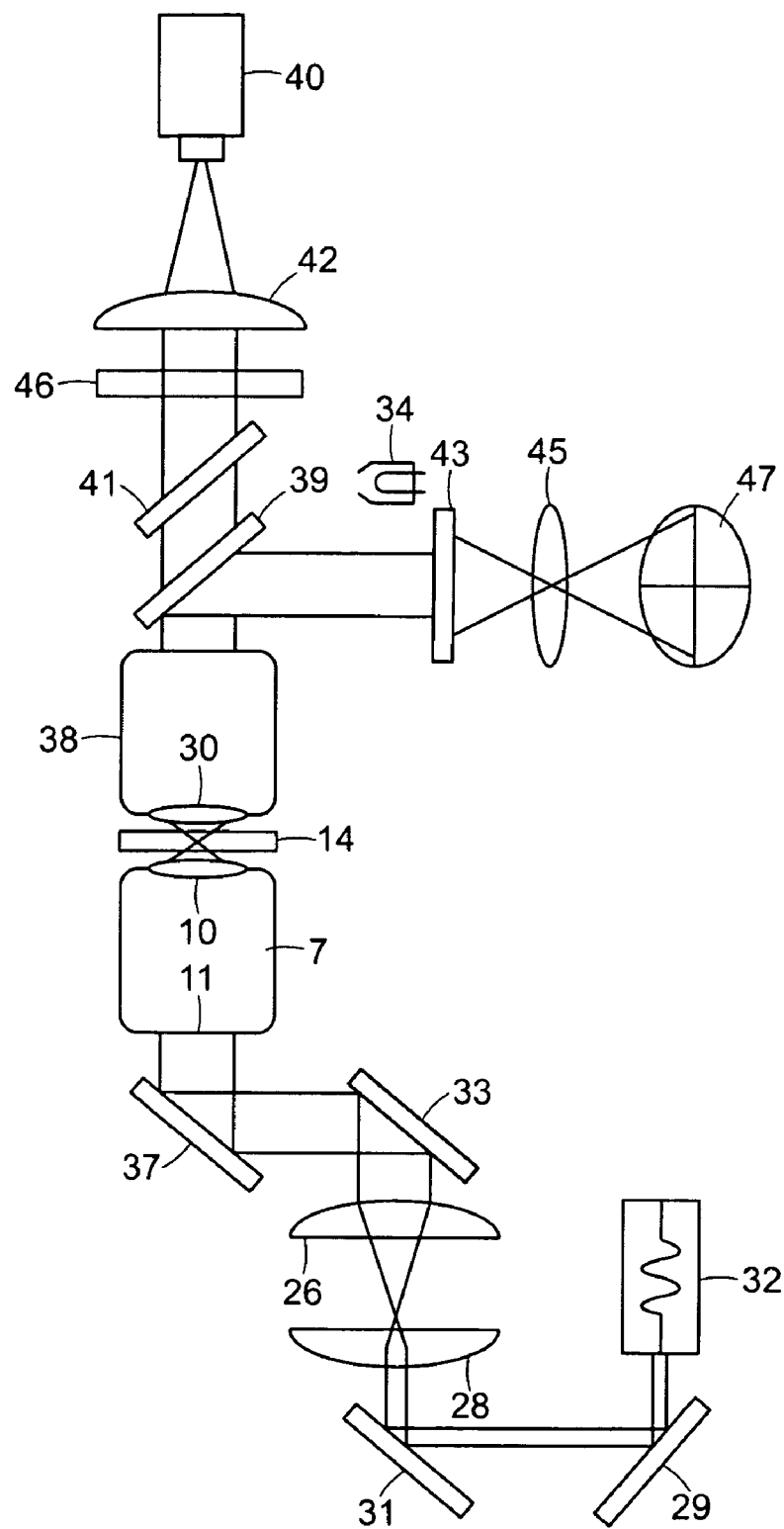
FIG. 4A illustrates a preferred embodiment of the method and system of the present invention for an optical trap through semiconductor.

Another hurdle presented by employing a semiconductor substrate 46 in an optical trap system is that this substrate is opaque within the visible light region. As shown in FIG. 4A, one preferred embodiment of an optical trap through silicon system solves this problem by implementing what would have traditionally been described as a condenser-side imaging system; however, since the set-up can use two objectives, there need not be a condenser element to implement this imaging. This places the light source 34 and the CCD camera 40 on the same side of the sample (in terms of the optical path), and uses the same imaging lens 30 to focus the illumination source on the sample plane and collect the reflected light from the sample and focus it into the image for the camera. This differs from another preferred embodiment system, for example, where the illumination and the camera are positioned on opposite sides of the sample, for example, with the camera collecting the light transmitted through the sample (See, for example, FIG. 2D and FIG. 4B).

In the preferred embodiment shown in FIG. 4A, two objective lenses (10, 30) are the core of the system, used on both sides of the sample plane. The first objective lens 10 sits below the silicon substrate in sample chamber 14 and is used to focus an infrared laser beam at the sample plane for the purpose of creating the optical trap. The telescope lenses 28 and 26 each allow the trap to be steered in the same plane. The imaging objective lens 30 is used in place of the standard condenser lens. Here, it acts to focus the illumination light as well as provide an image of the sample plane to the camera 40. The tube lens 42 is used to magnify and form the image created by the imaging objective. The sample chamber 14 is mounted on a three-axis stage for translation, and the trapping beam adjustment is accomplished through the combined coordination of telescope lenses 26, 28 and the steering mirrors 29 and 31. Still referring to FIG. 4A, the preferred embodiment further provides for a low pass dichroic filter 39 allowing visible light to pass through; and a 50% silvered mirror 41 for the "reflective" imaging setup. A neutral density filter 43, focusing lens 45 and quad photo-diode (QPD) position-sensing device 47 (or a position sensitive device (PSD) which can be used nearly interchangeably with the QPD), comprise a position detector apparatus that is an integral part of positioning objects on a nanometer scale and measuring the force exerted by the optical trap. Alternative methods of position detection include using a video system, where the object position is acquired through image processing.

Figure 4B:
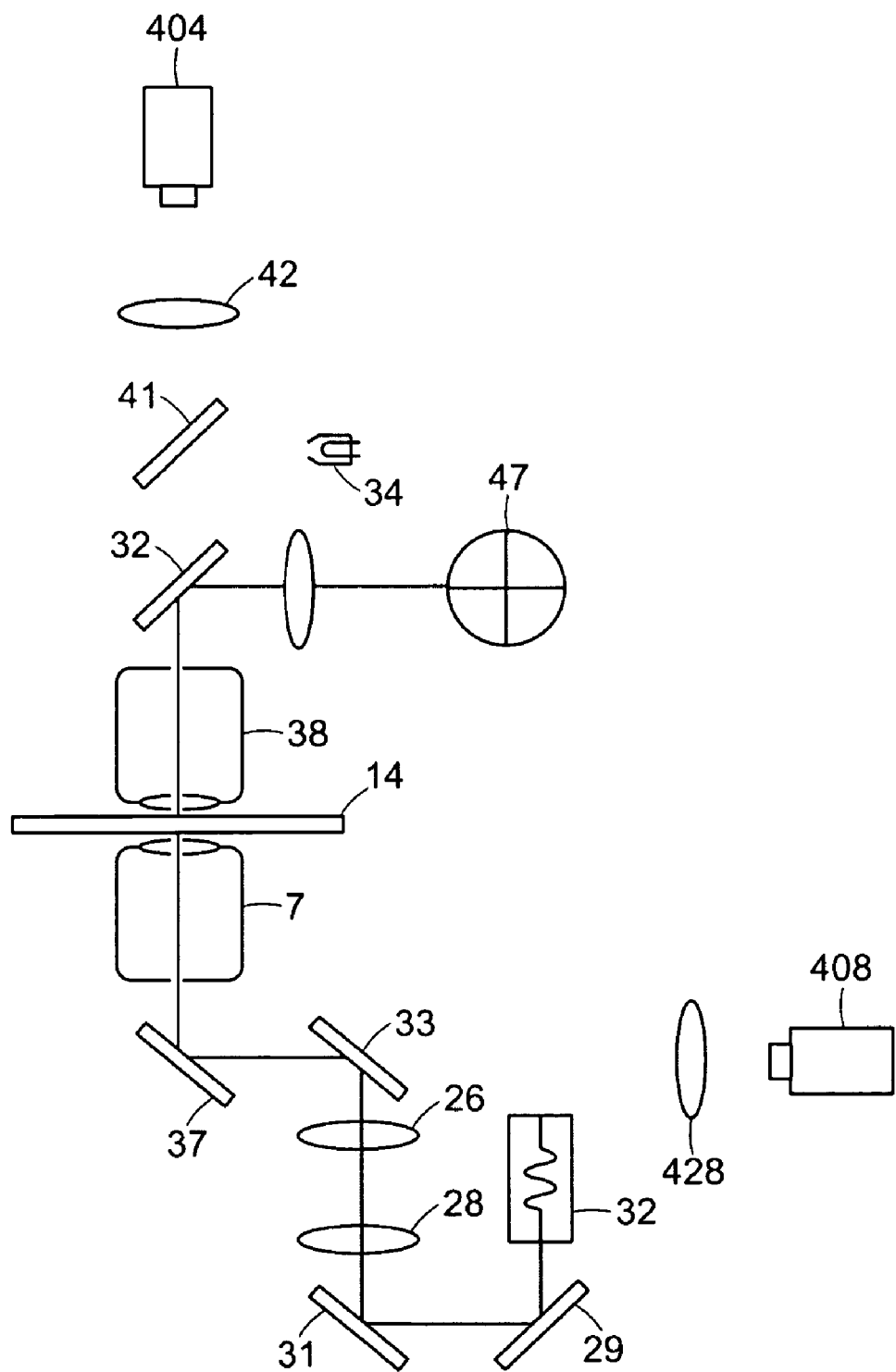
FIG. 4B illustrates another preferred embodiment providing an optical layout of a silicon-penetrating optical trap.

FIG. 4B illustrates another embodiment providing a more preferred optical layout of a silicon-penetrating optical trap. This layout comprises a reflective imaging camera 404; a transmission imaging camera 408; dichroic mirrors 33 and 39 to separate light paths; tube lenses 42 and 428 forming an image for the cameras; Quadrant photo diode 47 and lens 45 to form a back focal plane image on the QPD 47; light source 34; 45° mirror 37; steering mirrors 29 and 31 to align the laser; 50% silvered neutral density filter 41 to allow reflective imaging; reflective imaging objective 38; transmission imaging objective 7; and telescope lens pair 26,28 for beam expansion and steering. Lens element 45 focuses a point at the back focal plane of the condenser 38 on the QPD/PSD 47.

For visualization and imaging, high magnification is useful and important. Therefore, two objective lenses are used in a preferred embodiment, where one objective lens can provide higher magnification (such as, for example, 100×) and be optimized for clear image formation. However, integrating a second objective presents a challenge in terms of optical alignment, where even small deviation can create low-quality images and problems for position detection. To overcome this difficulty, a 2-axis stage can be integrated between the objective and the objective holder, allowing translation of the reflective imaging objective to place it in precise alignment.

Specific advantages have been realized in embodiments of the invention that provide for a particular arrangement of optical mounts and other aspects of the optical layout. An upright setup has been used in one embodiment, with a second pillar to support a three-axis stage which enabled adjusting the alignment of one of the objectives to obtain the on-axis alignment required for reflective imaging with two objectives (See FIG. 4A). However, the relatively greater weight of the three-axis stage, in addition to a camera and imaging lens system attached to the top of the pillars, was shown to cause undesirable vibration in the system, which in turn was found to lead to inconsistent position detection. Another embodiment provided for a horizontal design that substantially reduced the alignment and weight problems; however, the horizontal layout created imaging and detection issues owing to sample settling and oil migration.

A more preferred embodiment, as shown in FIG. 4B, incorporates a two-level platform and a vertical arrangement. The upper platform contains all of the detection and reflective imaging optics and the lower platform holds the trapping laser and transmission imaging camera. A pair of fabricated objective adapters and integration of a lightweight two-axis translation stage enables superior alignment. The two-level design has shown itself to be more stable and flexible, enabling a stronger trap and improved position detection.

A key advantage of preferred embodiments of the invention is that trapped objects can be positioned immediately adjacent to a semiconductor material, which allows for useful operations related to a semiconductor substrate, including designing, manipulating, sorting and assembling objects and/or devices at the nano-molecular scale. Further embodiments of methods of the invention illustrate utility of an optical trapping through silicon system and are presented below.

Figure 5A:
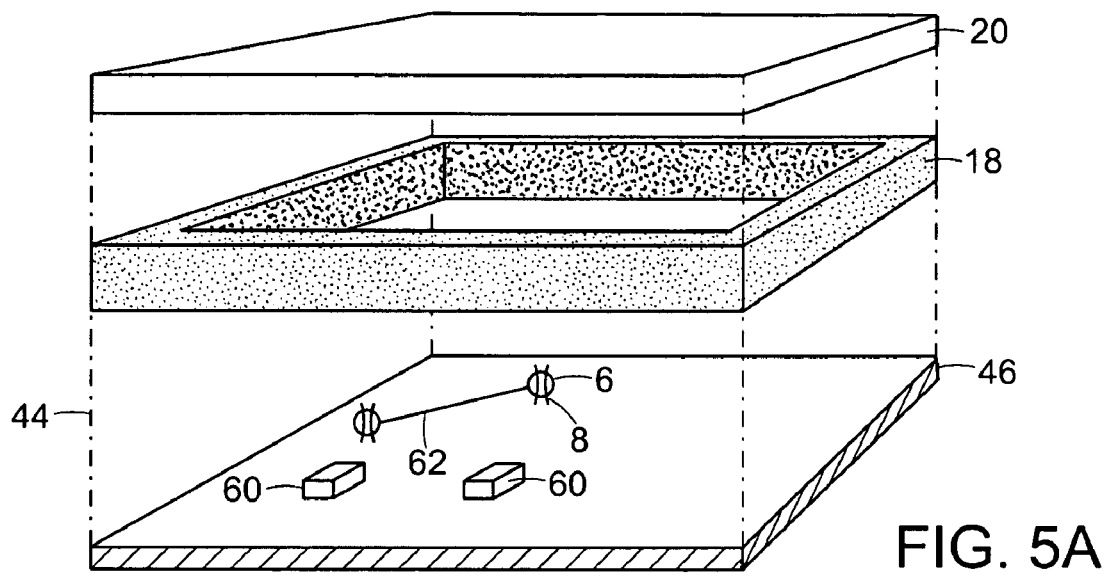
FIG. 5A illustrates an example of a preferred embodiment that provides for method of using an optical trap through semiconductor to grasp a nanowire.
Figure 5B:
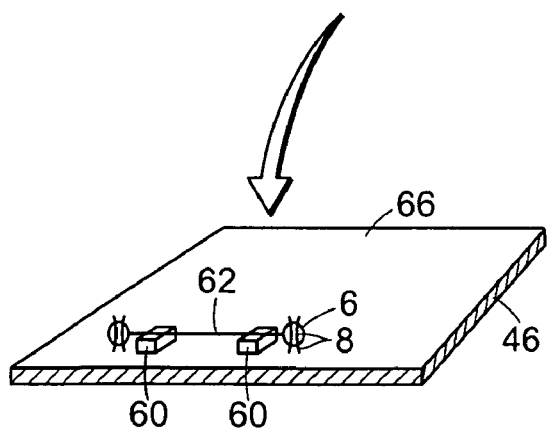
FIG. 5B illustrates an example of a preferred embodiment using an optical trap through semiconductor to place the nanowire into contact with a semiconductor substrate.

Referring again now to the drawings, FIG. 5A-5D together illustrate a further embodied method that provides for optically trapping one or more bead "handles" 6 that are connected to a nanowire 62, which may be a biological entity, such as, for example an M13 viral particle with functionalized head and tail regions to attach to bead(s) 6, and moving the nanowire or biological entity 62 into position for attachment at specific contact points on the semiconductor substrate 46. Other options include, inter alia, carbon nano-tubes, actin filaments, microtubules or DNA. In FIG. 5A the sample chamber 44 is shown in expanded detail, with glass cover slide 20 and spacer layer 18 schematically lifted away from semiconductor substrate layer 46. Two trappable "bead" objects 6, depicted as trapped by the schematic trap indicator(s) 8, are each attached at opposite ends of a nanowire 62. In this embodiment, two optical traps are being projected, each trap capturing one of the beads, which provide handles for manipulating nanowire 62. In FIG. 5B the optical traps have been moved relative to substrate 46, thus moving the trapped beads 6 and, in turn, relocating the nanowire 62 into direct contact with the contact points 60.

Figure 5C:
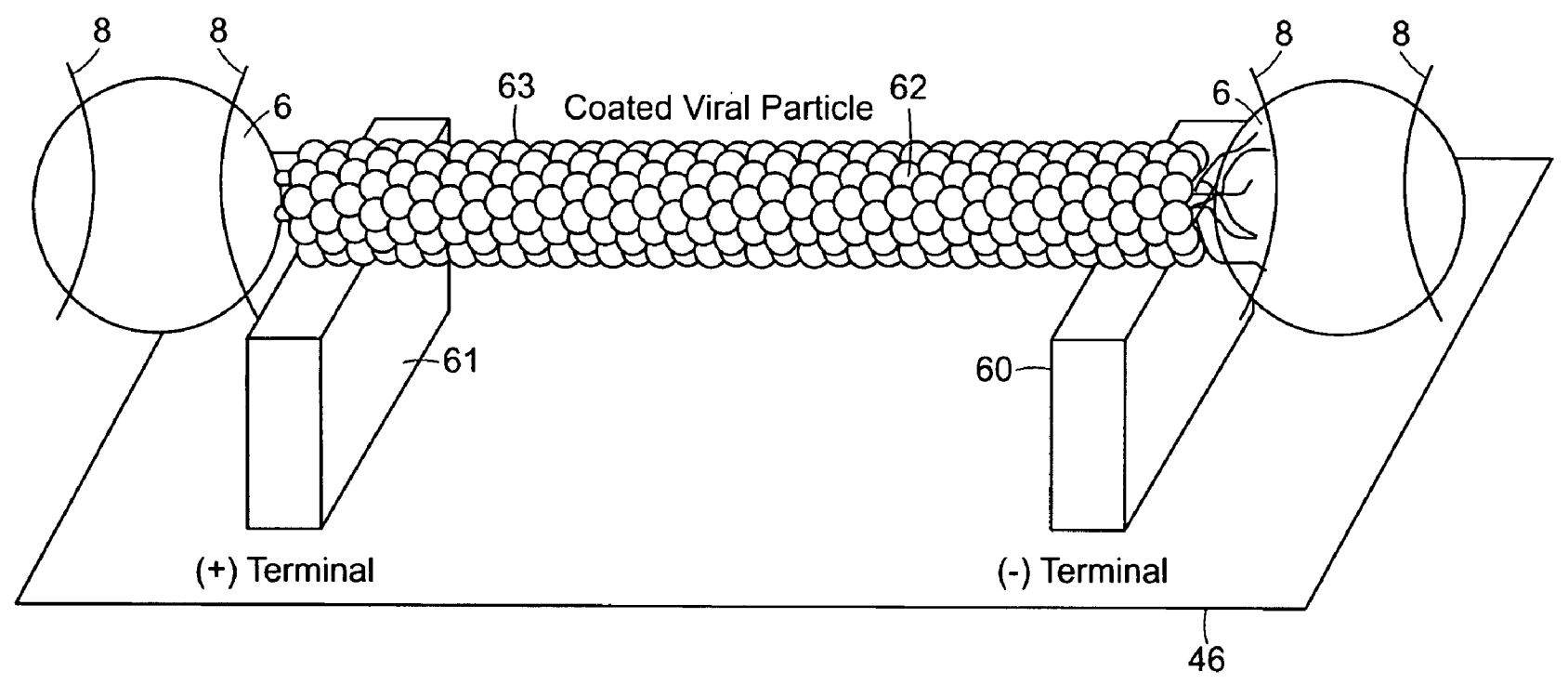

FIG. 5C illustrates in greater detail a nanowire 62 created by a coating 63 having been applied to a viral particle. Bead handles 6, shown as optically trapped by indicators 8, which handles are attached to the particle to create a 'dumbbell' shaped object, are used to position the nanowire 62 into contact with elements on semiconductor substrate 46. The substrate can be silicon and can be fabricated with two elevated terminals 60 and 61 about 400 nm apart and the substrate can form the coverslip of a sample chamber. A nanowire formed from an M13 virus can be incubated in a metal salt buffer (such as CdS) in order to mineralize the exterior of the virus coat [See, for example, Mao, C. B., D. J. Solis, et al. (2004). "Virus-based toolkit for the directed synthesis of magnetic and semiconducting nanowires." *Science* 303(5655): pp. 213-217, which is hereby incorporated by reference]. The dumbbell can then be positioned over the two terminals 60, 61 as shown in FIG. 5C. It will be appreciated that multiple methods, chemical and physical can at this point be employed to complete the adherence of the nanowire to the terminals 60, 61, including chemical reaction, photo-initiated polymerization or other physical operation to glue or tightly close the contact junctions. One embodiment provides for the nanowire to be held in place by the photoinitiated polymerization of acrylamide, using bis-acrylamide crosslinking agents and a triethanolamine/riboflavin 5' phosphate sodium salt photoinitiator system. In the case of a nanowire formed from an M13 viral particle coated with CdS, the organic portion of the virus can be removed through a 350° C. annealing process, leaving a 475-500 nm CdS wire spanning the terminals 60, 61. The terminals 60, 61 may be an electrically positive and electrically negative, respectively, and the placement of the CdS nanowire can complete an electric circuit integral to the semiconductor substrate 46.

Another preferred embodiment of the invention provides a method for creating a membrane tether, which is an extremely thin tube of material that can be pulled or drawn out steadily from a membrane or liquid boundary surface by the force of the optical trap. This tether can form an extremely thin, wire-like structure, which structure can be similar to a nanowire. This membrane tether can be pulled from a number of different types of chemical and biological entities, including droplets, cells and/or other assemblages or molecular compounds having a membrane or boundary layer. The membrane tether can be drawn out to lengths of anywhere between 1 nm-10 s of nanometers, and may include lengths longer than a micrometer in optimal conditions. The membrane tether can be fixed, or set, by a variety of processes that may be applied to the tether after it as been drawn out or during the process of it being drawn out, such as, for example, applying chemical or photo-initiated fixing processes, magnetic or electric field processes, sonic, heating, cooling or other setting processes to hold and/or fix the structure over time. The membrane tether can be fixed, or set, by a variety of processes that may be applied to the tether after it as been drawn out or during the process of it being drawn out, such as, for example, applying chemical or photo-initiated fixing processes, magnetic or electric field processes, sonic, heating, cooling or other setting processes to hold and/or fix the structure over time.

Figures 6A, 6B:
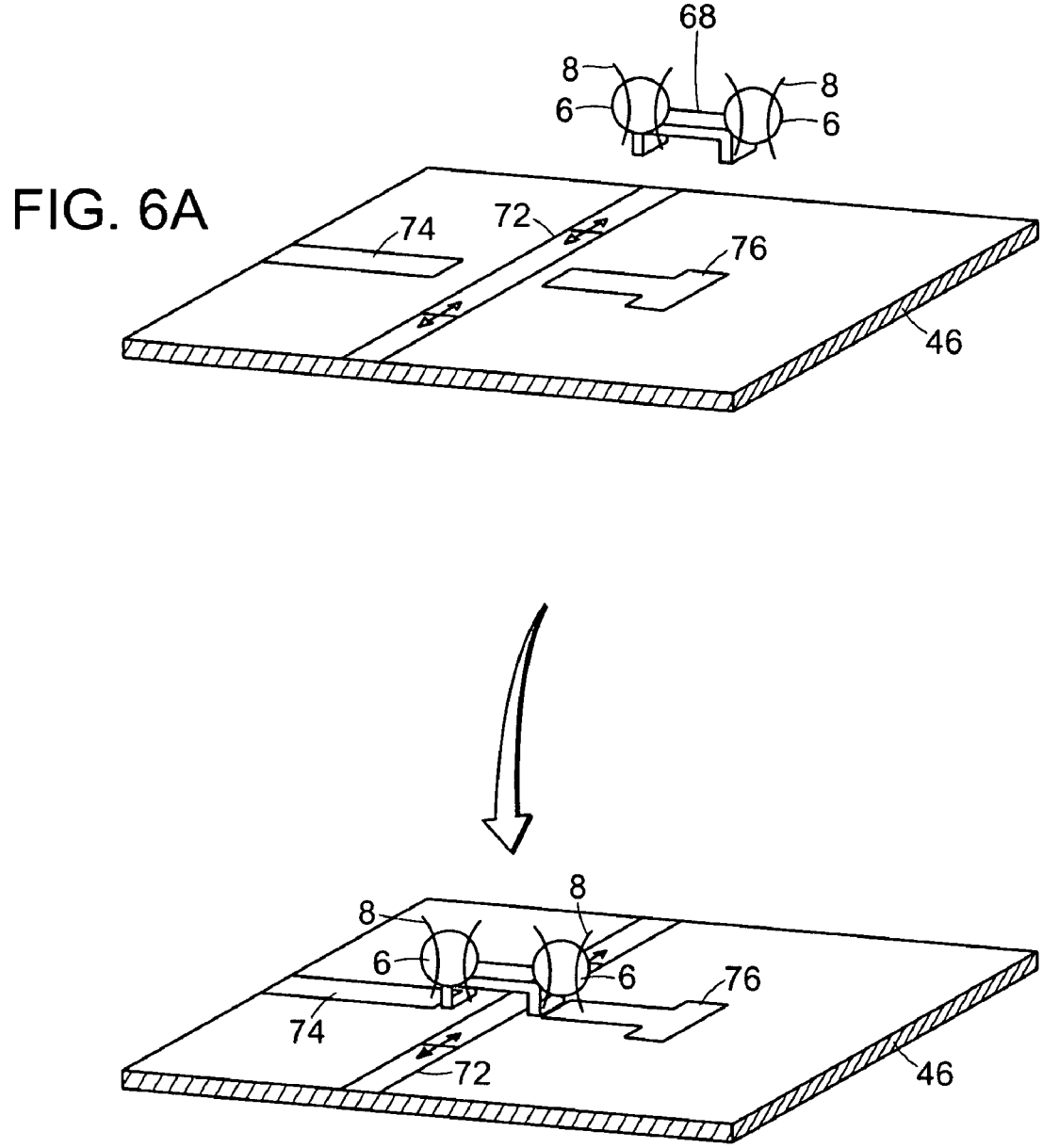
FIG. 6A illustrates an example of a preferred embodiment providing a method of using an optical trap through semiconductor to grasp a nanobridge structure.
FIG. 6B illustrates an example of a preferred embodiment using an optical trap through semiconductor to place the nanobridge structure into contact with a semiconductor substrate.

In the further embodiments described below, all based on a similar semiconductor substrate 46, depiction of the spacer layer 18 and cover slide 20 will be omitted for convenience; however, it should be understood that many of these operations will preferably be carried out within a sample chamber that contains a liquid medium surrounding the trapped objects. Referring to FIG. 6A and FIG. 6B, the operation of trapping and manipulating bead handles 6 attached to a prefabricated nano-bridge structure 68 provided for in a further embodiment, for example, for moving a conducting bridge into position for attachment to span from one surface feature 74 on the semiconductor substrate 46 to another surface feature 76 that is separated from the first feature 74 on the same surface by a surface feature 72. The surface feature 72 is characterized by a flow of electrons, or conduit for particles or fluid, or is otherwise related to some aspect of physical, dynamic movement of this surface region. It is advantageous to be able to provide a 3-dimensional bridge connection between feature 74 and feature 76 that maintains separation from surface feature 72 below the bridge. In FIG. 6A two trappable beads 6 are each attached at opposite ends of a nano-bridge 68. Again, two optical traps are being projected, each trap capturing one of the beads shown as trapped by trap indicators 8. The trapped beads 6 provide handles for manipulating the nano-bridge 68. A person of ordinary skill in the art will recognize that trappable beads are not needed in all cases; with some cases the nano-object can be directly trapped and moved. In FIG. 6B the optical traps have been moved relative to substrate 46, thus moving the beads 6 and, in turn, relocating the nano-bridge 68 into direct contact with features 74 and 76 on the substrate surface. It will be appreciated that multiple methods, chemical and physical can at this point be employed to complete the adherence of the nano-bridge to the contact regions of features 74 and 76, including chemical reaction, photo-initiated polymerization or other physical operation to glue or tightly close the contact junctions.

Figure 7A:
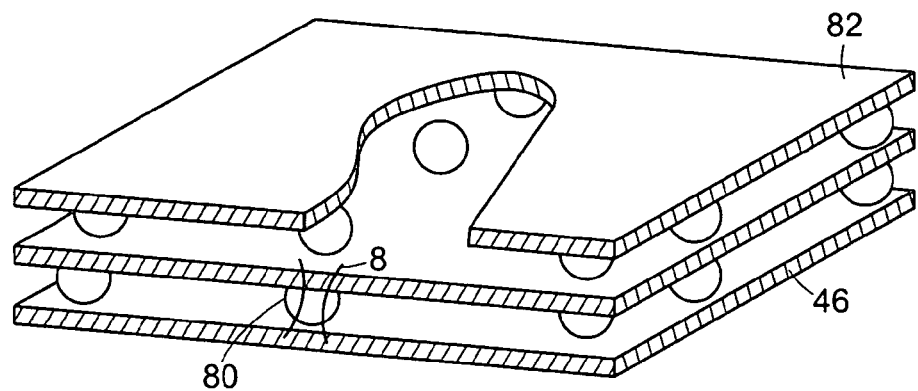
FIG. 7A illustrates an example of a preferred embodiment providing a method of using an optical trap through semiconductor to manipulate microscale objects, such as microspheres, between silicon layers.
Figure 7B:
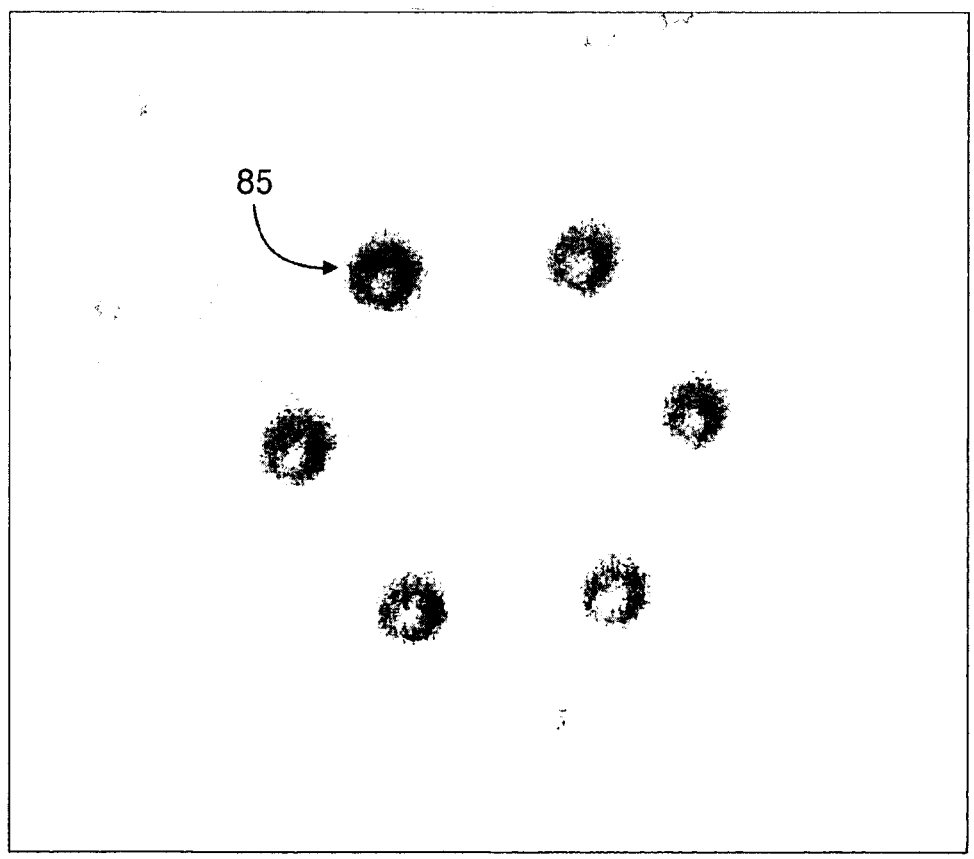
FIG. 7B is an image showing six 2.2 micron diameter silica beads trapped in a hexagon arrangement through a Si substrate using the time-shared AOD method according to the invention.
Figure 7C:
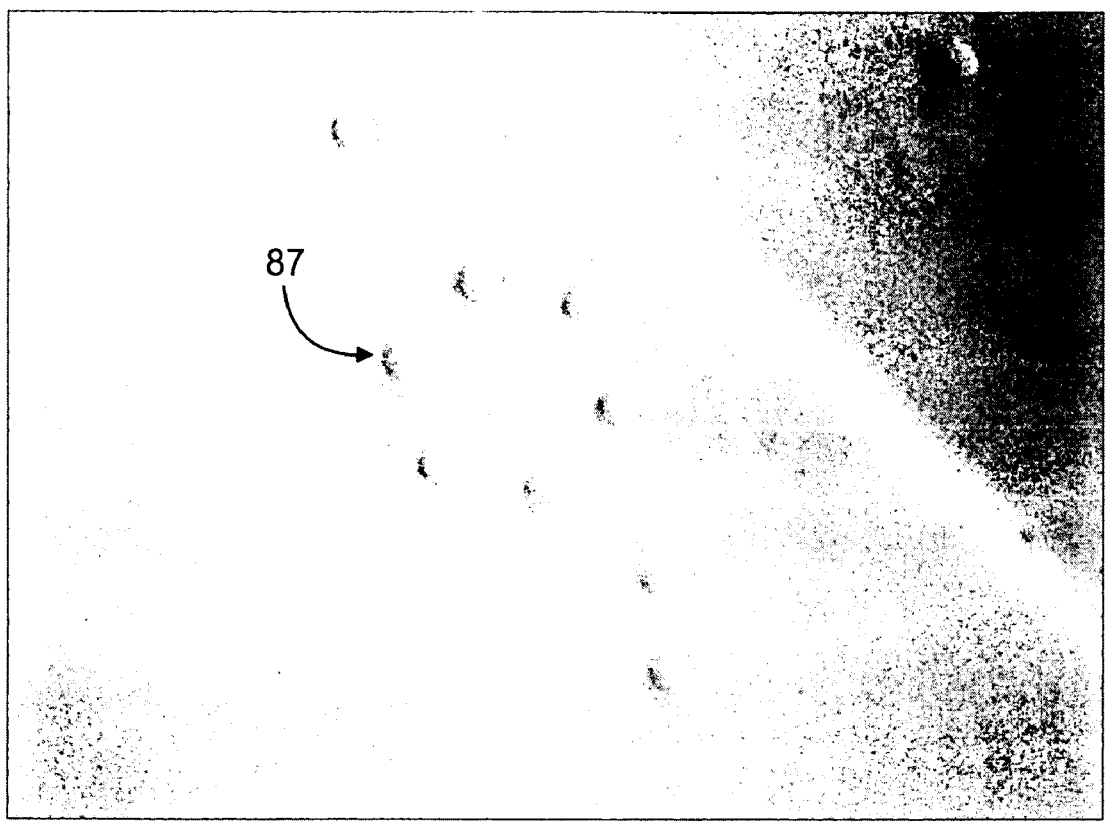
FIG. 7C is an image showing bead trapping and manipulation over a silicon wafer having a Ge film.

Referring to FIG. 7A, a further embodiment discloses the method of precisely orienting an object 80 held by an optical trap, as symbolized by trap indicators 8 in relation to semiconductor 46, where there may be present another semiconductor layer 82, or multiple layers. The optical trap allows manipulation of object 80 by light penetrating one or more of the semiconductor layers, even if object 80 is sealed from access by any other manipulation means. In the preferred method illustrated here, the layers are silicon and multiple conducting microspheres are positioned by the optical trap between the Si layers. FIG. 7B shows an image of six 2.2 micron diameter silica beads 85 trapped through a Si substrate in a hexagon arrangement using a time-shared AOD method according to the method of the invention. The beads were then rotated, translated, and the hexagon diameter was changed on the fly. The image was formed by an imaging system according to an embodiment of the invention. FIG. 7C shows an image of five 2.2 micron diameter silica beads 87 trapped over a semiconductor substrate, i.e., before the beam hits the substrate. The traps are formed using the same time-shared AOD method described above. Here the substrate is a Si wafer having a Ge film.

Figure 8A:
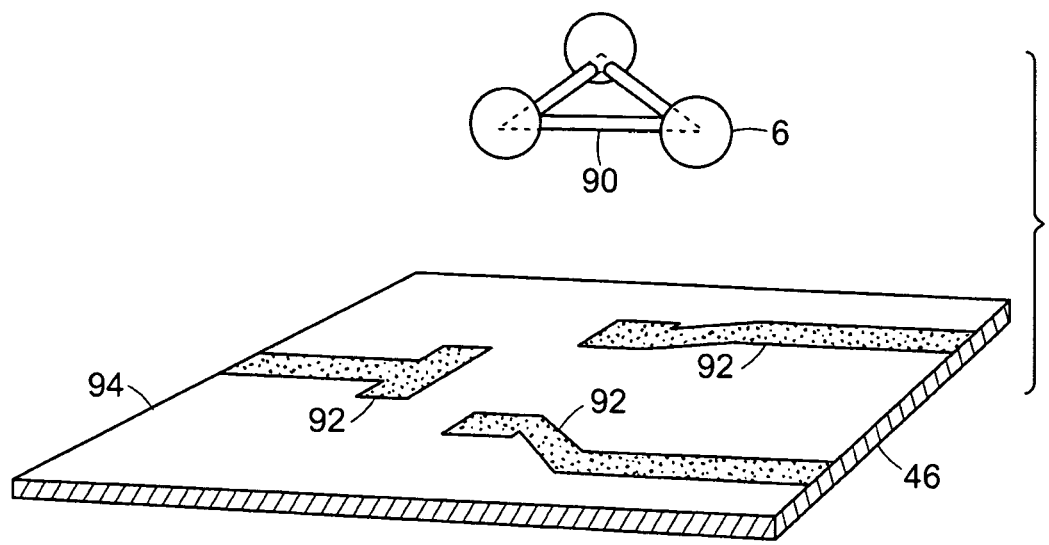
FIG. 8A illustrates an example of a preferred embodiment using an optical trap through semiconductor to manipulate a nanostructure having multiple bead handles.
Figure 8B:
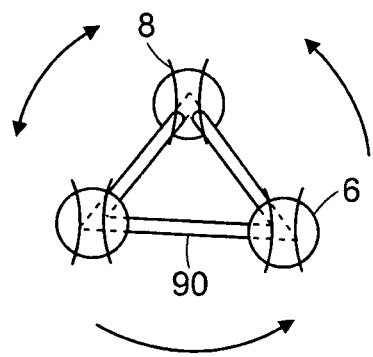
FIG. 8B illustrates an example of a preferred embodiment using an optical trap through semiconductor to manipulate a nanostructure with bead handles in three dimensions to position it for contact with the substrate structure.
Figure 8C:
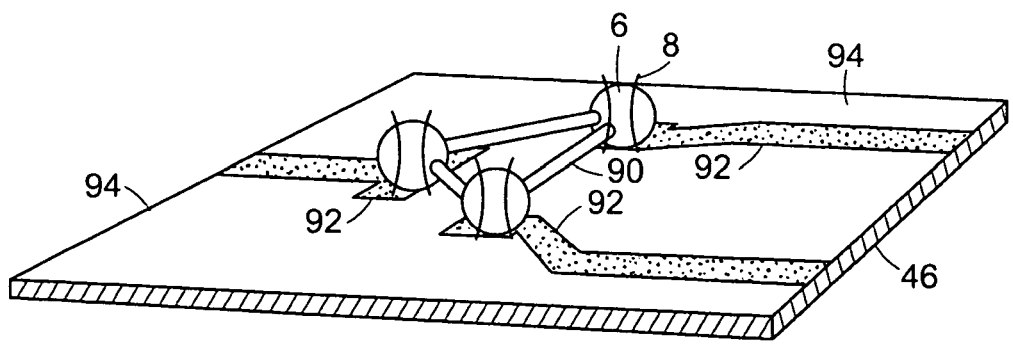
FIG. 8C illustrates an example of a preferred embodiment using an optical trap through semiconductor to place the nanostructure having multiple bead handles into contact with a microfabricated surface in the semiconductor substrate.
Figure 8D:
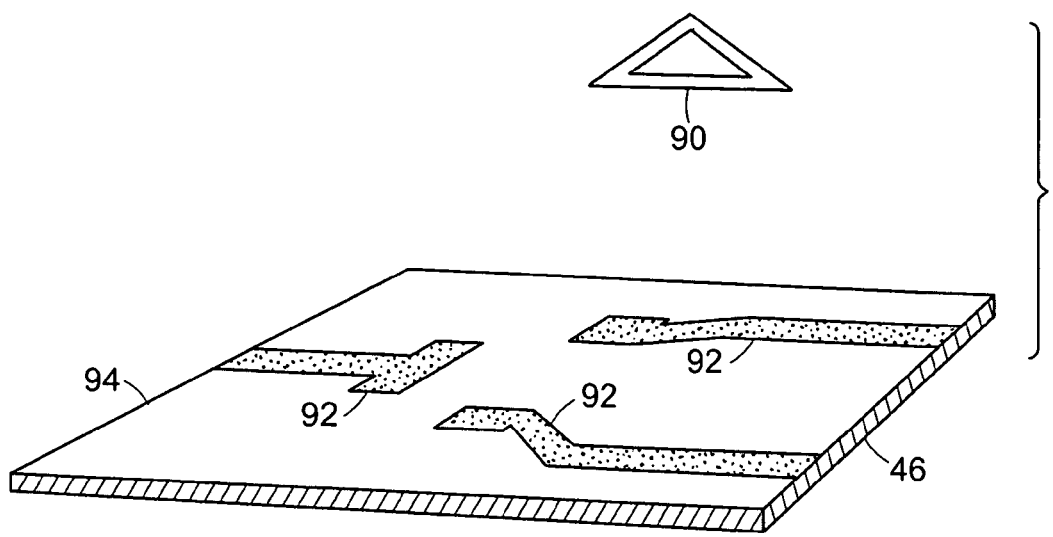
FIG. 8D illustrates an example of a preferred embodiment using an optical trap through semiconductor to manipulate a nanostructure.
Figure 8E:
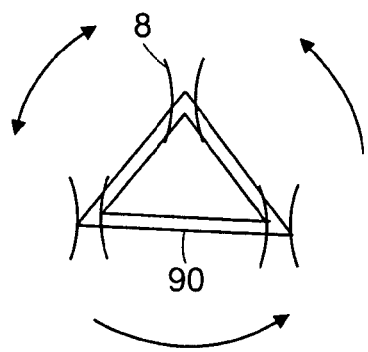
FIG. 8E illustrates an example of a preferred embodiment using an optical trap through semiconductor to manipulate a nanostructure in three dimensions to position it for contact with the substrate structure.
Figure 8F:
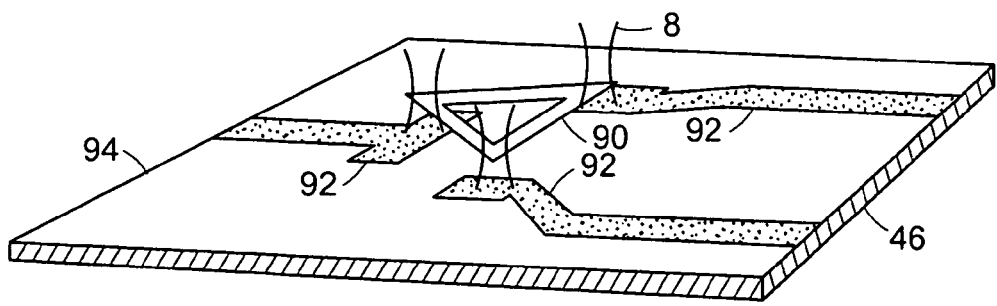
FIG. 8F illustrates an example of a preferred embodiment using an optical trap through semiconductor to place the nanostructure into contact with a microfabricated surface in the semiconductor substrate.

Referring to FIGS. 8A, 8B and 8C, another embodiment of the invention provides for using multiple bead handles 6 to manipulate and rotate a micro-object 90 in three dimensions, as depicted. Where in embodiments discussed above, the movement included at least translation using two trapping beams and variation of angle φ and focal depth (as shown in FIG. 2A), in this instance all three parameters, angle θ, φ, and focal depth are varied for each of three beams in order to complete control over a 3-bead object. Again, in some cases bead handles are not necessary, where the micro-object can be trapped directly, as shown in FIGS. 8D-8F. In such instances, reference to single or plural bead handles herein shall apply equally to single or plural trappable points of a micro-object. Orientation in the x and y planes/directions is also possible by rotating the polarization of the trapping beam, creating two closely spread traps, creating an asymmetric trap, or additional methods. Because visualization can be difficult in some instances, movement or placement may be by calculation and steering means. FIG. 8B depicts 3-D rotation of object 90 in a preferred embodiment. In FIG. 8A, heterogeneous, electrical or optical conductive features 92 on the surface of micro or nanoscale semiconductor material 46 are not continuously connected. After placement by the optical trap positioning of object 6, the features 92 are brought into electrical or optical connectivity, as shown in FIG. 8C. It will be appreciated that this configuration can be made permanent by a next bonding step applied to the contact points, or could remain transiently switchable, where an automated coupling of an external decision circuit or signal network applied to the multiple trapping beams could produce a low-friction, low-resistance, fast optical or electrical switching function, depending on the structure of object 90. As mentioned above, FIGS. 8D-8F illustrate similar manipulation applied directly to a micro- or nano-object, without using intermediate bead handles.

A further preferred embodiment of the invention provides for using one trapping beam to form multiple optical traps essentially simultaneously in the trapping region. This can be accomplished by employing the acousto-optic deflectors (AODs), shown in FIG. 2C, in a rapid modulating fashion, whereby changes in RF frequency passed into the AODs cause rapid deflection of first-order deflection beams, of which one beam can be isolated to become the trapping beam. Rapid oscillation of alternating beams, at switching frequencies in the range of 1 Hz (if the diffusion speed of the object is very low) to the functional limit of the AOD, and preferably in the range of 10 kHz to 250 kHz, can accomplish creating two, three or more traps in rapid, asynchronous, cyclic succession, where the time interval that any one trap remains in the "off" state is sufficiently short that the physical effect of the trap upon the trapped micro-object is maintained. In addition to time-sharing a single beam with an AOD, multiple traps can be formed by integrating a holographic optical element into the system, or by separating the beam with a beam splitting optical element.

Figure 9A:
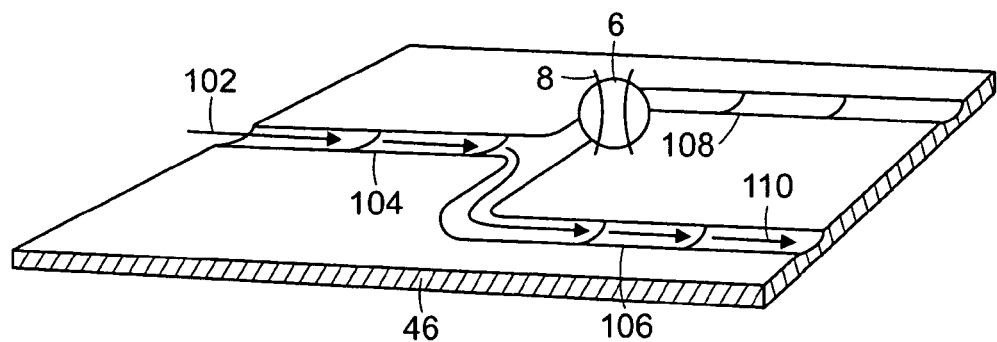
FIG. 9A illustrates an example of a preferred embodiment providing a method for using an optical trap through semiconductor to position switchably a trapped bead in a switching configuration in a microchannel fluidic, gaseous or photon flow on a silicon or other substrate.
Figure 9B:
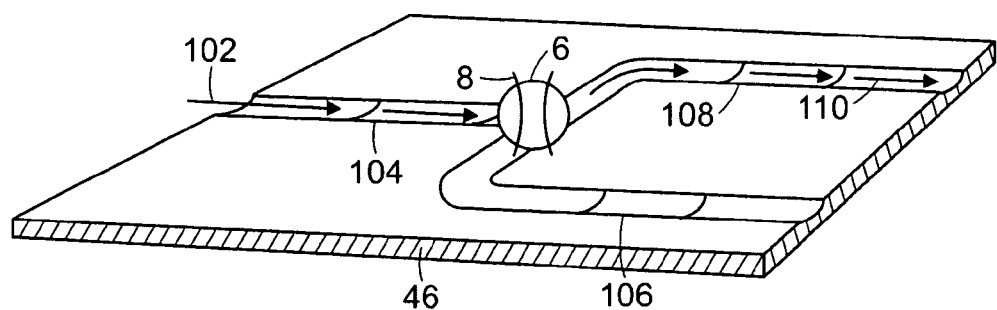
FIG. 9B illustrates an example of a preferred embodiment using an optical trap through semiconductor to move a trapped bead as a switch in a microchannel flow in the silicon substrate.

Referring to FIGS. 9A and 9B, the invention provides for a switching mechanism in the presence of an optical trap comprising an input path 104, input flow 102, alternatively output flow pathways 106 and 108, trappable or moveable switching object 6 (shown here as trapped by trap indicator 8), semiconductor substrate 46, and outflow 110. In FIG. 9A flow 102 is directed along path 104 to find a path of lesser resistance along output path 106, so that outflow 110 follows path 106. Alternatively and switchably, trap indicator 8 depicts the optical trap moving switch object 6 to block (or increase resistance) within path 106 thereby moves outflow to path 108. This flow can be fluid, photonic or electrical current where in each case the switching object 6 is suitably chosen to produce resistance to fluid flows, photonic flow or electrical flow, respectively.

The invention also contemplates, for example, optical trapping in microfluidic applications. Such applications can employ any suitable type of microfluidic for a given application. Exemplary microfluidics can include, without limitation, microfluidic substrates, cells, tubes, ports and so forth, and any combinations thereof. Such microfluidics can also comprise, for example, wells, channels, loading regions, loading ports, flow control channels, nutrient channels, mixing and reaction zones, recovery wells, arrays and combinations thereof. Exemplary microfluidics can also comprise silicon or other semiconductor materials such that an optical trap through semiconductor, or closely proximate to semiconductor, of a system according to a preferred embodiment of the invention can form an optical trap through or substantially proximate to the microfluidic or a plurality thereof, which can include, for example, wells, channels, loading regions, loading ports, flow control channels, nutrient channels, mixing and reaction zones, recovery wells, arrays and combinations thereof.

Figure 10:
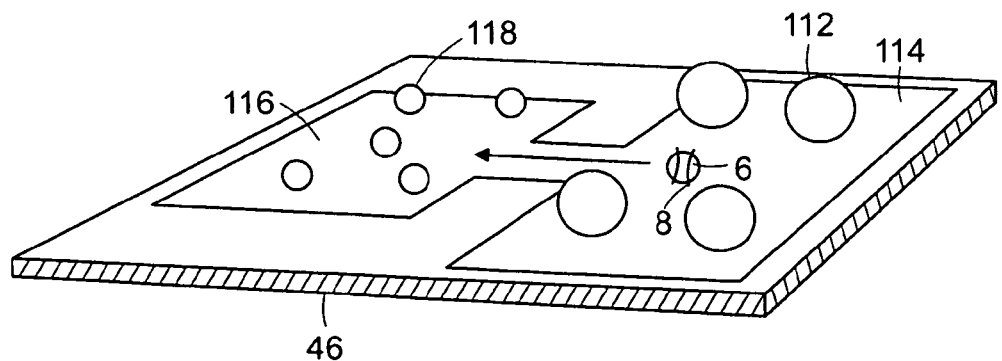
FIG. 10 illustrates an example of a preferred embodiment using an optical trap through semiconductor to sort a cell or particle from an unsorted group of particles to a sorted region.

Another embodiment, illustrated in FIG. 10 provides for a method of sorting micro-scale and/or nanoscale objects. The objects may differ in size, shape or other detectable feature or characteristic. Here unsorted region 114 contains object 6, and larger object 112, inter alia. An optical trap, shown by trap indicator 8, through semiconductor 46 is applied to move object 6 in a sorting operation (or a concentrating operation) into sorted region 116, where object 118 is more similar to object 6 than are objects 6 and objects 112 to each other. This operation can also be seen as increasing the concentration of objects in region 116.

It will be appreciated that the disclosed method for sorting in FIG. 10 can be combined with the method for manipulation of optically trapped objects within a gap between semiconductor layers shown in FIG. 7A, with the combination allowing for finely tuned microfabrication of a specialty semiconductor material.

Referring now to FIG. 11A, one embodiment of the invention provides for using an optical trap in fabricating a microscale or nanoscale biomedical or biological research or diagnostic component 48 whereby semiconductor material 46 has disposed on its surface circuit features that connect a pre-assembled nano-device 50 with one or more linkage molecule(s) 51, attachment component(s) 52 and surface circuit feature(s) 54. An optical trap, depicted by trap indicator 8, is used to move bead-handles 6 and attached linkages 51 and components 52 into position. Alternatively, the optical trap moves objects 52 directly. During fabrication, spacer 18 and cover slide 20 may be used as part of trap chamber 44, and these may be removed afterwards to create component 48. FIG. 11B shows component 48 deployed in a biocellular cavity location 56 (free floating in bloodstream, within a cell, or elsewhere within a biological tissue, plasma or organic assemblage, where information may be transmitted by electromagnetic signal, such as RFID transmission 49 to a receiving device. In FIG. 11C the component 48 is attached to a needle probe 58 and may also transmit information directly via the probe. Here the component 48 is placed within a plasma, cell, tissue, region, or other anatomical location. In such application, both components 53 and linkage molecules 51 can serve as diagnostic activators, with nano-component 50 and other potential, similarly placed components providing storage, sequencing, switching, activation, transmission, receiving, and/or power functions, inter alia. Component 50 can include RFID information for passive tracking. Contacts 55 may connect component 48 to other electrical circuitry, probes or equipment. Other features and/or processes may be associated with these biomedical research, diagnostic or therapeutic applications, such as deliver cells and tissues to the nanochip, coupled with cell seeding for tissue growth.

Figure 12A:
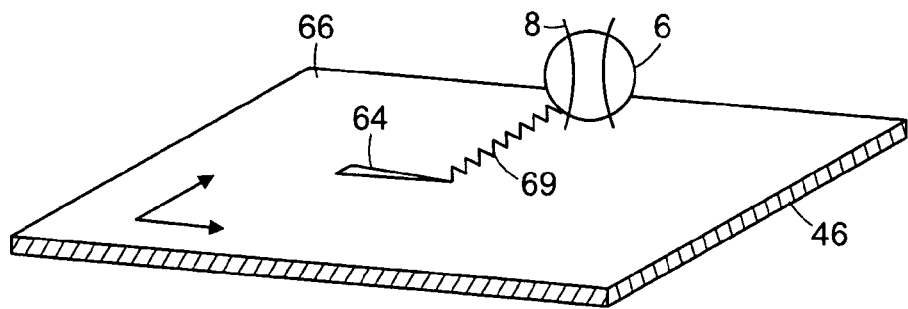
FIG. 12A illustrates an example of a preferred embodiment method of using an optical trap through semiconductor to position a surface characterization probe in proximity to or contact with a semiconductor surface and/or surface feature in order to examine the surface.
Figure 12B:
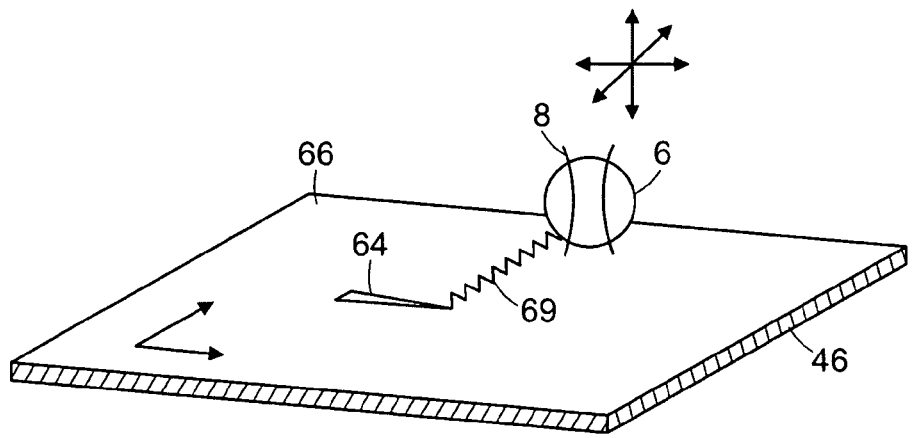
FIG. 12B illustrates an example of a preferred embodiment providing a method of using an optical trap through semiconductor to position a force-probe in proximity to or contact with a semiconductor surface and/or surface feature(s).
Figure 12C:
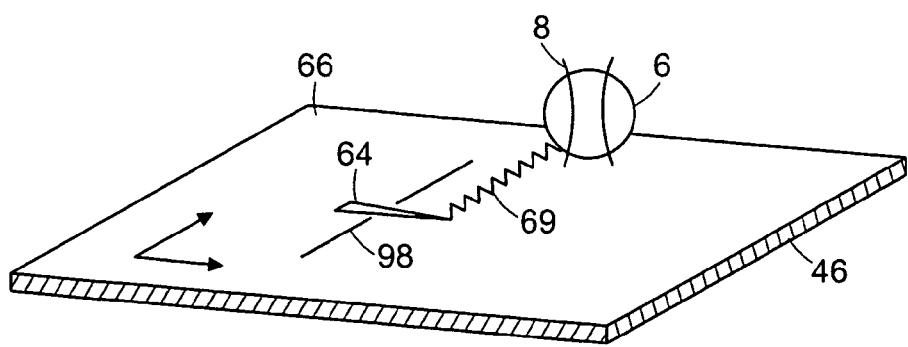
FIG. 12C illustrates an example of a preferred embodiment including a method of using an optical trap through semiconductor to position a force-probe in proximity to or contact with a semiconductor surface and/or surface feature(s).

Referring to FIGS. 12A-12C, a further embodiment of the invention discloses a method to utilize an optical trap, depicted by trap indicator 8 with a bead handle 6 attached to a linker 69 to position a probe molecule 64 relative to a characterized surface 66 of a semiconductor material 46 in close proximity to a semiconductor material. The probe molecule 64 may interact chemically and/or physically with the surface 66, with bond interactions, surface interactions and/or selectivity to surface and features being the subject of study by probe 64. FIG. 12B depicts a further embodiment in which the bead 6, linker 69 and probe 64 are together used to study force exertion on the probe and to monitor position of the probe relative to the surface 66. In this case the position of the trap beam can be moved to exert and measure force.

Referring to FIG. 12C, yet another embodiment is disclosed comprising a method for detecting and characterizing a surface feature 98 positioned on surface 66 that is part or closely proximate to semiconductor material 46. Here the optical trap is depicted moving object 6, shown trapped by trap indicator 8, wherein trapped object 6 controls a probe 64 through linkage 69. One or more surface features 98 can comprise an edge, step, crack, flaw, and/or other detectable feature. Further aspects of optical trapping with force measurement are generally described in U.S. Provisional Application No. 60/720,118, entitled "SYSTEMS AND METHODS FOR FORCE-FLUORESCENCE MICROSCOPY", filed Sep. 23, 2005, which is hereby incorporated by reference herein in its entirety.

Figure 13:
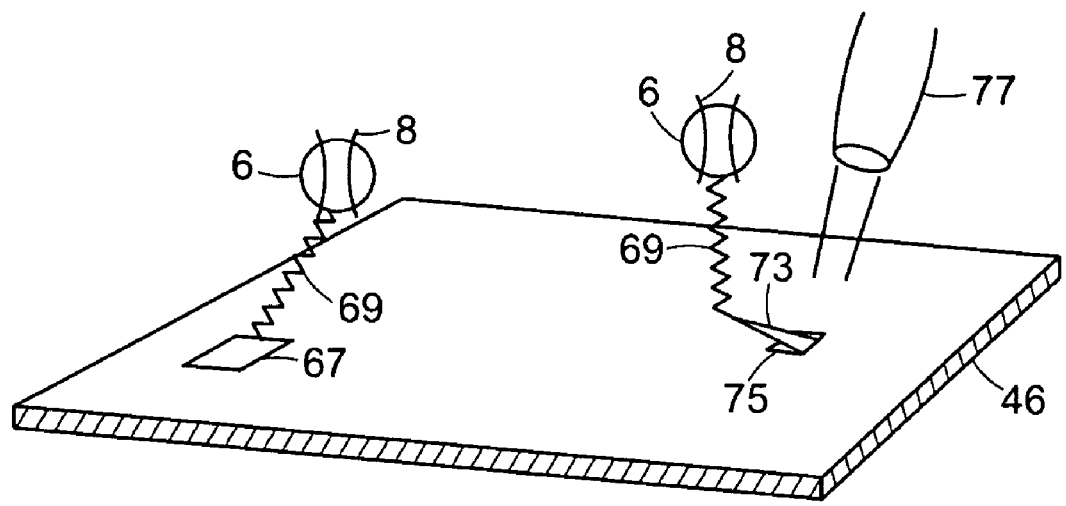
FIG. 13 illustrates an example of a preferred embodiment that includes a method of using an optical trap through semiconductor to position a trapped object in proximity to or contact with a semiconductor feature or location, while a secondary laser or chemical process initiates polymerization.

Referring to FIG. 13, the invention discloses a method whereby a photo-initiated polymerization using a focused UV or appropriate visible laser, or two-photon pulsed laser in the IR, can be combined with the positioning ability of an optical trap to coordinate the active, directed, construction of microstructures in silicon and other semi-conductor systems. Additional adhesives include the use of biological or chemical linkages (biotin/streptavidin) or hydrophobic interactions. Here, in one instance, an optical trap moves an object 6, shown here as trapped by trap indicator 8, and linkage molecule 69 into position for attachment at surface attachment region 67. In another instance, a linker 69 moves object 73 to be attached at polymerization site 75 by UV light beam 77. A further embodiment provides for using a photoinitiated polymerization of acrylamide to form an attachment, using bisacrylamide crosslinking agents and a triethanolamine/riboflavin 5' phosphate sodium salt photoinitiator system.

Figure 14:
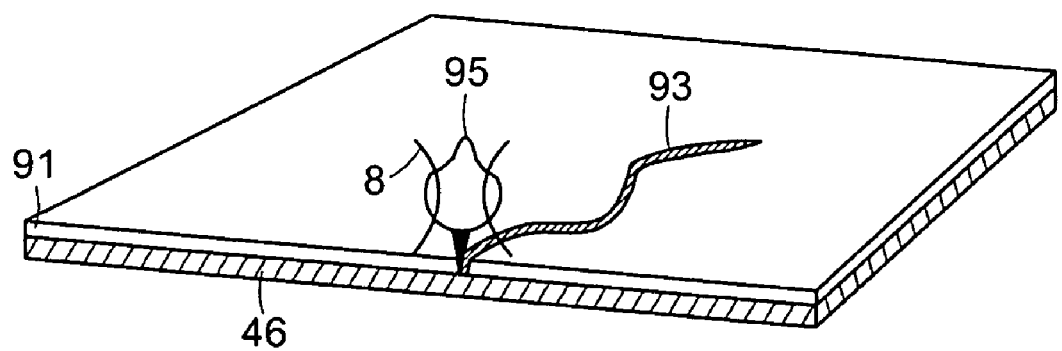
FIG. 14 illustrates an example of a preferred embodiment including a method of using an optical trap through semiconductor to position and move a stylus.

Referring to FIG. 14, yet another embodiment of the invention provides for using an optical trap to hold and a stylus 95, depicted here as optically trapped by trap symbol 8, and direct the stylus to move along a path 93 upon a semiconductor layer or upon another thin-film layer 91 disposed upon the semiconductor layer 46.

Further embodiments of the invention provide for including optical trapping through semiconductor in the manufacture and/or application of catalyst design tool(s) and bioreactor design tool(s).

Figure 15A:
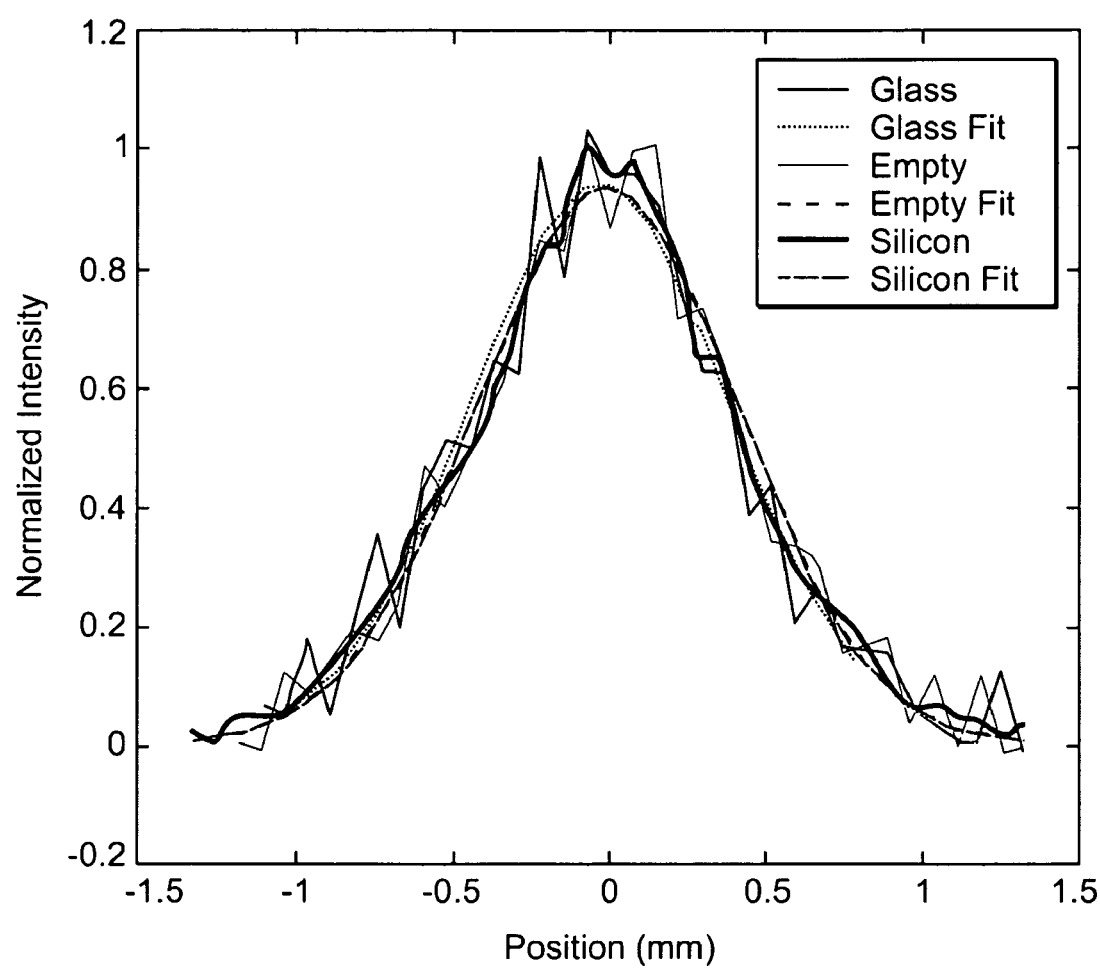
FIG. 15A illustrates a transmitted beam profile of a 975 nm laser impinging on glass and silicon coverslips.

Examples of embodiments providing for forming an optical trap through silicon further illustrate aspects of the invention. In one embodiment, a 975 nm laser was used to form the optical trap through a 200 µm Si sample, the sample being a <100>, double side polished, segment of an undoped wafer from Virgina Semiconductor (Fredericksburg, Va.). The Si sample was not treated to remove the oxide layer. The 975 nm diode laser has a maximum output around 200 mW, which was enough power to form a strong optical trap, being able to transmit approximately 6% through the Si substrate. The beam profile of the 975 nm laser was measured and compared to the profile after transmission through the silicon substrate, and the overlay of the profiles, shown in FIG. 15A, is nearly identical, suggesting the absence of scattering. FIG. 15A shows the transmitted beam profile of the 975 nm laser impinging on glass and silicon coverslips. The measured beam profiles were fit to a Gaussian single mode.

Figure 15B:
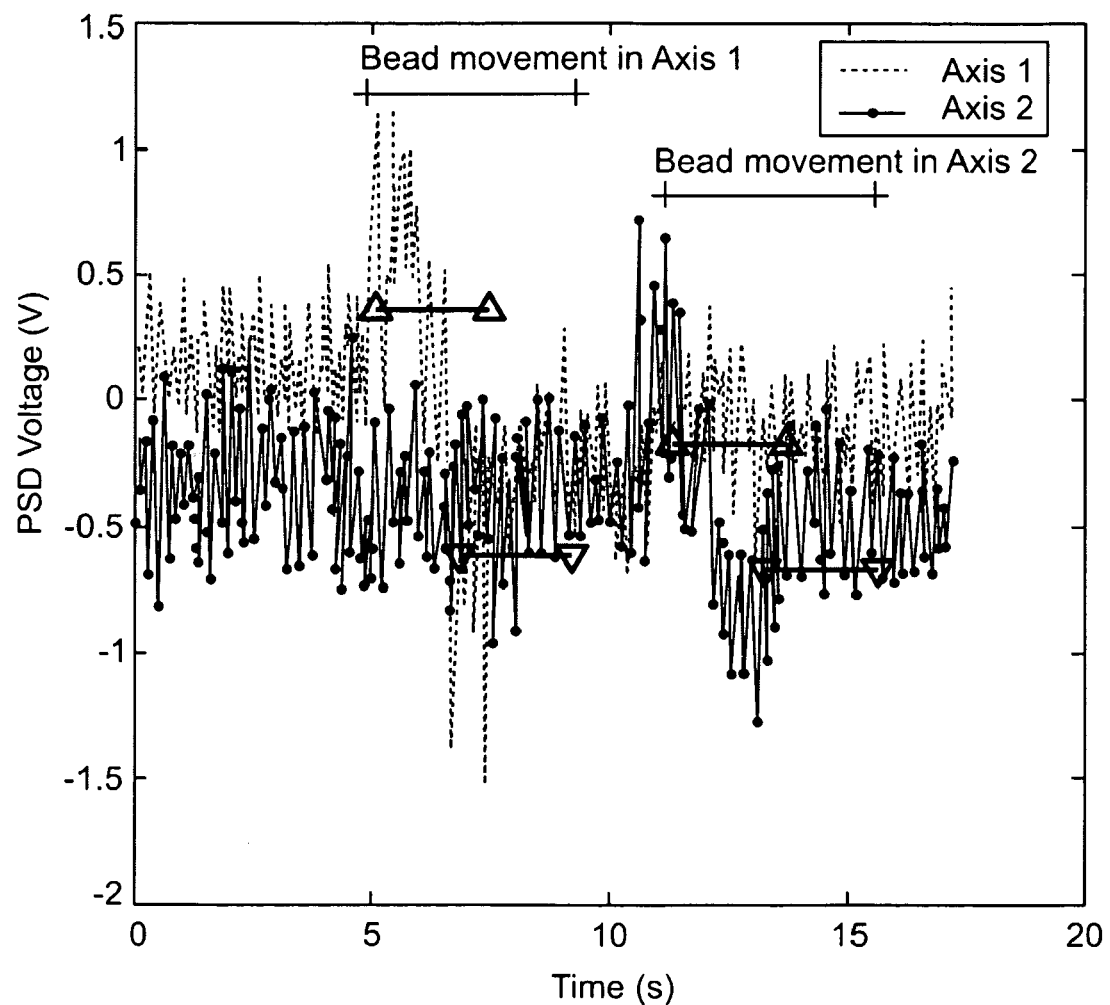
FIG. 15B illustrates quadrant photodiode-based position detection through a silicon substrate using a laser trapping a 1 μm silica bead.

In a further embodiment, a position-detection branch was installed and evaluated in combination with the silicon substrate. Position detection was demonstrated through a 200 µm double-side-polished, undoped silicon substrate using a 975 nm laser with a transmission of approximately 6 mW trapping a 1 µm silica bead. The QPD sensor was able to detect Stokes drag displacements of the bead in the trap, where the bead is held in place in a fluid-filled sample chamber by the optical trap and the piezoelectric nano-positional stage is translated to provide a drag flow to displace the bead from the center of the trap. Results of the evaluation are shown in FIG. 15B, where the voltage of the position sensitive detector (PSD), in this case a quadrant photodiode detector (QPD), is shown as a function of time (seconds). The straight lines terminated by triangles highlight the relative direction of movement and duration.

Optical trapping methods according to embodiments of the invention can be used to elucidate many different interactions in the biological realm. Because the optical trap can exert forces in the 1 to 300 pN range, it is an optimal force probe for many biological systems. The flexibility with which fluorescence signals can be measured in tandem offers the ability to extract force and conformation simultaneously. For example, kinesin and myosin motility have been examined successfully, extracting binding force, step size, and performance under an applied load. Binding orientation can be elucidated by using force as an indicator of geometry. These precise measurements of force and geometry are possible because optical trapping methods according to the invention enable the isolation of single molecules.

Figure 16A:
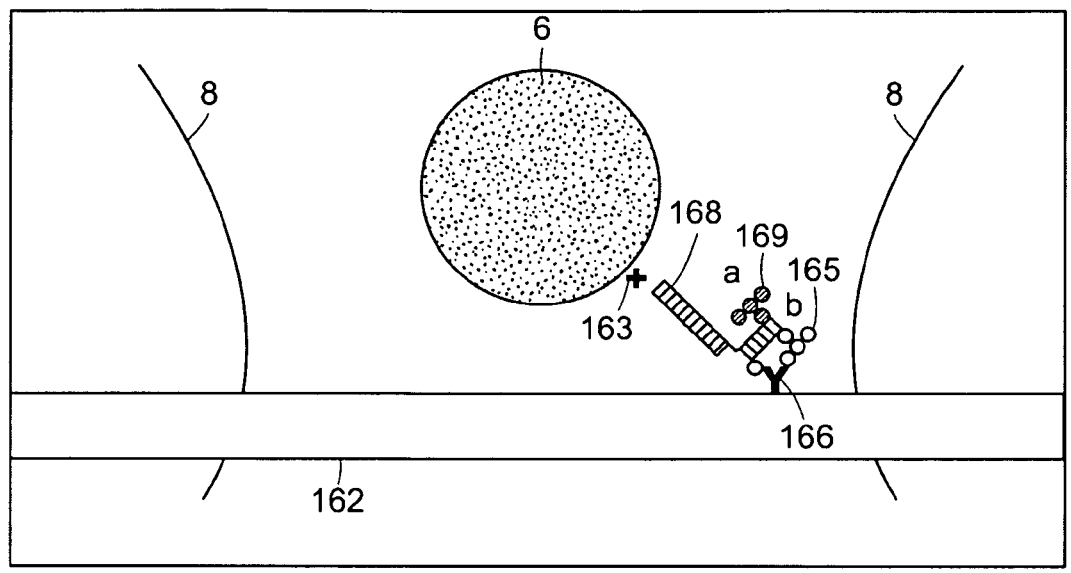
FIG. 16A illustrates an assay geometry for a DNA unzipping experiment with combined optical trapping and single molecule fluorescence.
Figure 16B:
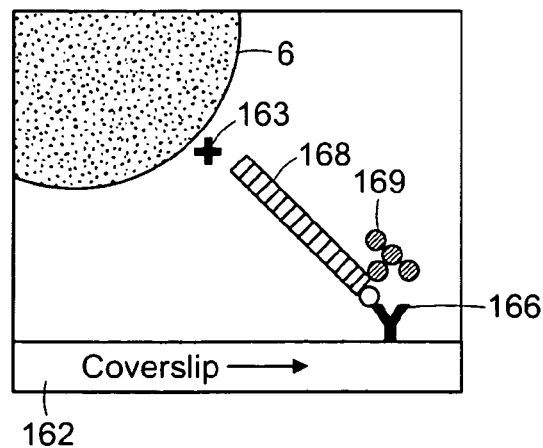
FIG. 16B illustrates an assay geometry for a DNA shearing experiment with combined optical trapping and single molecule fluorescence.
Figure 16C:
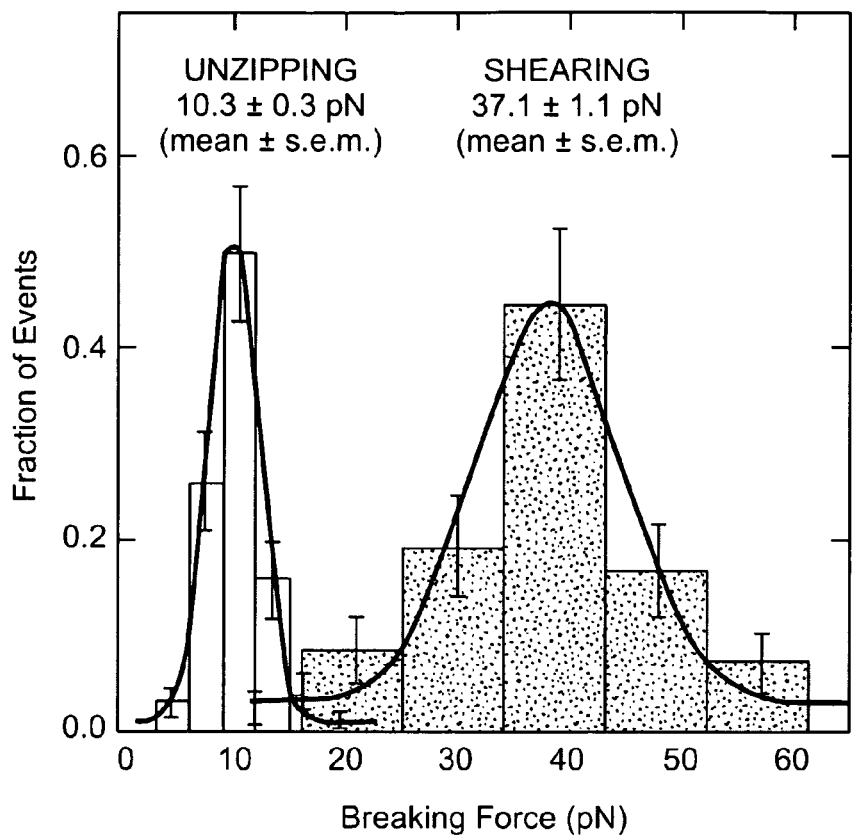
FIG. 16C is a histogram displaying an ensemble study of rupture force for both unzipping and shearing geometries with a fit probability distribution function.

FIG. 16A illustrates an assay geometry for a DNA unzipping experiment with combined optical trapping and single molecule fluorescence. Here a trappable bead 6 is attached by an avidin-biotin linkage 163 to a DNA long strand 168. A digoxigenin-antidigoxigenin linkage 166 attaches the DNA chain to coverslip 162. Detection of tetramethlyrhodamine (TAMRA) 169 and other species 165 allows monitoring of creation of a 15-base-pair oligomer (15-mer) through an unzipping mode break in the strand. FIG. 16B illustrates an assay geometry, with the same components, for a DNA shearing experiment. Referring to the histogram in FIG. 16C, this research method enabled measurement of almost a four-fold difference in the mean rupture force measurements between unbinding and shearing geometries of a double-stranded DNA oligomer.

Figure 17A:
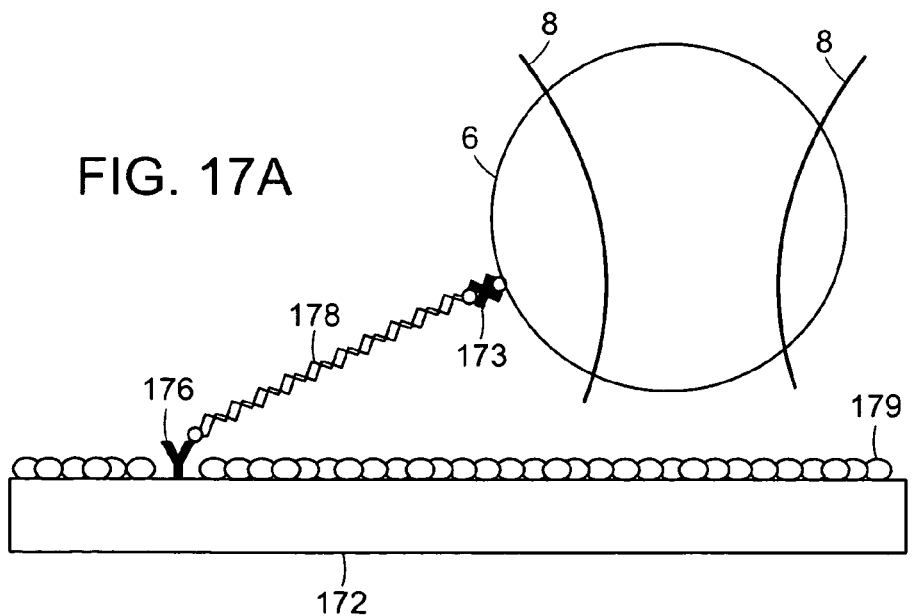
FIG. 17A illustrates an elastin tether assay geometry, where an elastin molecule is attached to a surface using a digoxigenin/anti-digoxigenin linkage and attached to an optically trapped bead using a biotin/avidin linkage.
Figure 17B:
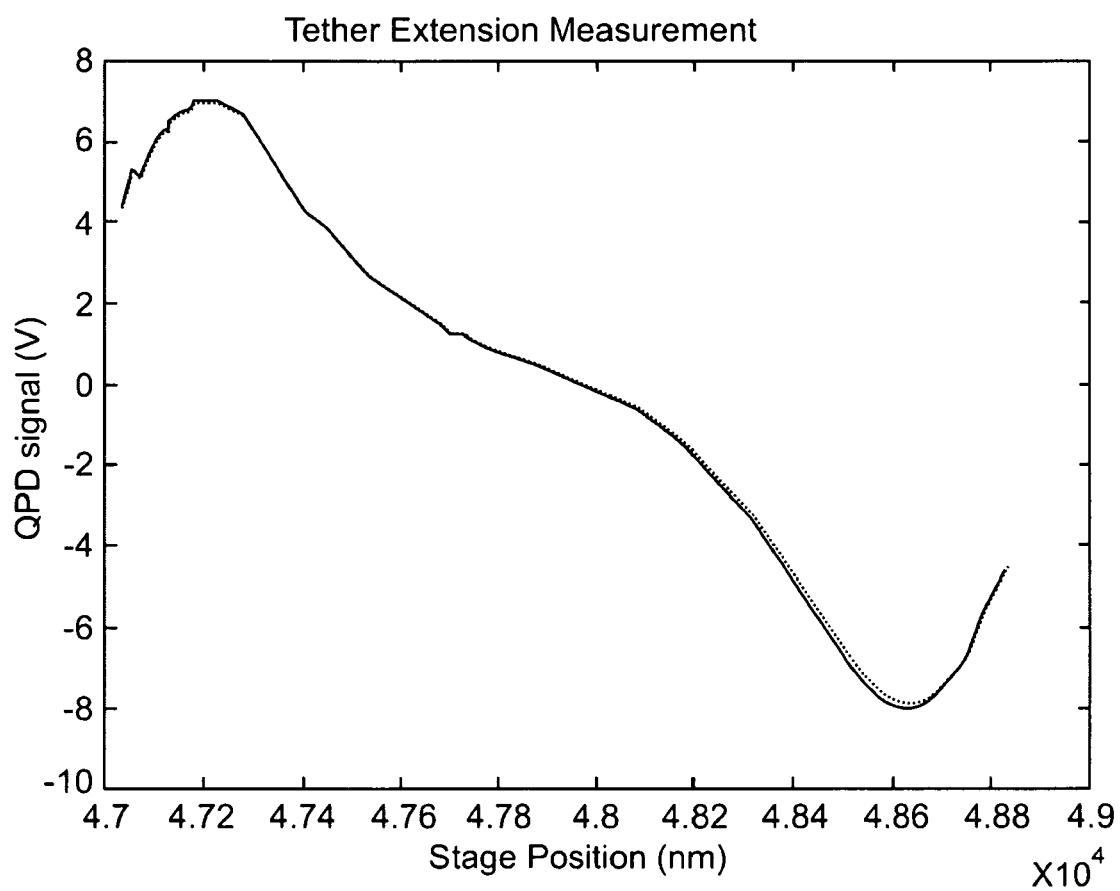
FIG. 17B illustrates a tether extension curve showing an ideal DNA tether stretching evaluation.

A further example of using an optical trap to position a probe molecule is depicted in FIG. 17A, where a further embodiment provides for an elastin tether 178 configured for a probe assay. An elastin molecule 178 is attached to the surface of substrate 172 using a digoxigenin/anti-digoxigenin linkage 176 and attached to the bead 6, shown as trapped by trap indicator 8, using a biotin/avidin linkage 173. Casein and/or bovine serum albumin (BSA) proteins 179 are used to coat the coverslip surface and bead to reduce non-specific binding in the elastin system. Casein was found to minimize non-specific binding; however, BSA provided more repeatable results after adjustments to the assay protocol. FIG. 17B illustrates a tether extension curve showing an ideal elastin tether stretching experiment. The curve shows Quadrant Photodiode Detector (QPD) signal in Volts as a function of displacement of a piezoelectric nanopositioning stage over a distance of 1800 nm. Here the tether length was calculated to be about 250 nm. A software routine controls the optical trap and centers the bead over the tether and extracts the data for constructing the extension curve. The software is generally applicable for peptide/surface adhesion studies.

Multiple replicate measurements on the same sample and the generation of ensemble data from a sequence of single molecule experiments can be achieved. Automating the optical trapping source, steering, sample and particle handling, trap time-sharing, image and data acquisition and data processing can maximize data collection efficiency. Such automation can be accomplished with computers, processors, software modules and instructions, coupled with appropriate actuators.

While the invention has been described in connection with a preferred embodiment, those skilled in the art will recognize other equivalents to the specific embodiments described herein. It is to be understood that the description is by way of example and not as a limitation to the scope of the invention and these equivalents are intended to be encompassed by the embodiments set forth above and the additional embodiments presented below.

What is claimed is:

1. A method for optically trapping an object comprising:
   optically coupling an active volume comprising a semiconductor material, to a light source; and
   directing light through the semiconductor material to form an optical trap in the active volume, the light applying a force to an object in the active volume.

2. The method of claim 1, wherein the semiconductor material comprises silicon.

3. The method of claim 1 further comprising providing a laser light source emitting at a wavelength in a range of 900 nm to 1400 nm for trapping through the semiconductor.

4. The method of claim 1 further comprising positioning a light converging lens between an infrared light source and the active volume.

5. The method of claim 1 further comprising providing a second lens to collect light from the active volume and an imaging device.

6. The method of claim 1 further comprising providing a semiconductor material less than 250 micrometers in thickness for trapping through the semiconductor.

7. The method of claim 1 further comprising providing a semiconductor material that is double-side-polished for trapping through the semiconductor.

8. The method of claim 1, further comprising forming a plurality of optical traps simultaneously within the active volume.

9. The method of claim 1, further comprising trapping a first object in said optical trap and trapping one or more additional microstructures from the group comprised of a nano-wire, a nano-bridge, a micro-stylus, an oligonucleotide strand, a biomolecular assemblage, a cell, a protein, a fluid and a force probe; and
   fixedly attaching at least one of the said additional microstructures to said first object; and
   controllably holding both the trapped first object and at least one additional microstructure by the optical trap applied to said first object.

10. The method of claim 9, further comprising moving the optical trap to move the object and said additional microstructure into direct contact with a surface on or above the semiconductor material.

11. The method of claim 10, further comprising fixedly attaching to said surface, by photo-polymerization, hydrophobicity or bonding agent, one of the said first object and the said additional microstructure that has been made to contact said surface.

12. The method of claim 1, further comprising positioning a surface on or above the semiconductor material, said surface having non-homogeneous features that direct electrical or photonic signals.

13. The method of claim 1, further comprising positioning a surface on or above the semiconductor material, said surface having non-homogeneous features that uses microfluidic flow.

14. The method of claim 11, further comprising providing a surface on or above semiconductor material, said surface having a plurality of surface features that conduct electrical or photonic signals; and
   fixedly attaching one of the said first object and the said additional microstructure to said substrate at a location of one of said surface features.

15. The method of claim 11, further comprising positioning a surface on or above the semiconductor material, said surface having non-homogeneous features that direct microfluidic flow; and fixedly attaching one of the object and microstructure to said substrate at a location of said non-homogeneous surface feature.

16. A device for optically trapping an object comprising:
an active volume comprising a surface of a semiconductor material; and
a light source optically coupled to the active volume through the semiconductor material to form an optical trap of the object in the active volume.

17. The device of claim 16 wherein the semiconductor is silicon.

18. The device of claim 16 further comprising a laser light source emitting at a wavelength in a range of 900 nm to 1600 nm.

19. The device of claim 16 further comprising an optical element or a light converging lens positioned between the light source and the active volume.

20. The device of claim 16 further comprising a second lens to collect light from the active volume and an imaging device.

21. The device of claim 16 further comprising a semiconductor material less than 250 micrometers in thickness.

22. The device of claim 16 further comprising a semiconductor material SSP, double-side-polished or flat to form a trap.

23. The device of claim 16, further comprising one or more additional light sources optically coupled to the volume to produce respectively one or more additional optical traps or position sensing beams simultaneously within the active volume.

24. The device of claim 16, further comprising a light source beam that is controllably movable so as to enable the optical trap to be controllably movable.

25. The device of claim 24, further comprising a device for fixedly attaching a trapped object to the semiconductor material by photo-polymerization, hydrophobicity or other bonding means.

26. The device of claim 16, wherein the surface of the semiconductor material comprises non-homogeneous features designed to control electrical or photonic signals.

27. The device of claim 16, wherein the surface of the semiconductor material comprises a non-homogeneous feature that directs microfluidic flow.

28. The device of claim 16 further comprising a light detector coupled to the active volume.

29. The device of claim 28 wherein the detector detects an image of one or more trapped objects.

30. The device of claim 16 further comprising a position detector.

31. The device of claim 28 wherein the detector detects light transmitted through the volume by a second light source.

32. The device of claim 16 further comprising a beam steering device to steer a beam from a laser that traps an object in the volume.

33. The device of claim 16 further comprising a beam expander to control a size of a light beam coupled to the active volume.

34. The device of claim 32 wherein the beam steering device comprises an acousto-optic device.

35. The device of claim 16 wherein the optical trap traps a fluid.

36. The device of claim 35 wherein a trapped object comprises a fluid tether.

37. The device of claim 36 wherein the tether is at least 10 µm long.

38. The device of claim 16 further comprising a detector that detects light transmitted through the active volume.

39. The device of claim 16 further comprising a detector that detects light reflected from the active volume.

40. The device of claim 16 further comprising a detector that detects a trapped object attached to the surface of the semiconductor.

41. The device of claim 16 further comprising a nanostructure to be trapped in the active volume.

42. The device of claim 16 further comprising a second trapping volume having a second semiconductor surface.

43. The device of claim 16 further comprising a switcher to synchronously switch a light beam to trap a plurality of objects.

44. The device of claim 16 further comprising a holographic optical element to trap a plurality of objects.

45. The device of claim 16 wherein the semiconductor comprises one or more optically conductive elements.

46. The device of claim 16 wherein the semiconductor further comprises one or more electrically conductive components.

47. The device of claim 16 further comprising focusing light from the light source onto the active volume to form the optical trap.

48. A method of controlling motion of an object comprising optically coupling light to an active volume through a semiconductor material to control motion of an object within the active volume, the object being moveable while tethered relative to a surface of the semiconductor material.

49. The method of claim 48 further comprising coupling the object relative to a surface of a semiconductor device.

50. The method of claim 48 wherein the object is coupled with a fluid tether.

51. The method of claim 48 further comprising rotating the object relative to the surface.

* * * * *